(12) United States Patent
Leong et al.

(10) Patent No.: US 8,853,330 B2
(45) Date of Patent: Oct. 7, 2014

(54) HYBRID POLYMERS

(71) Applicant: Agency for Science, Technology and Research, Singapore (SG)

(72) Inventors: Yew Wei Leong, Singapore (SG); Beng Hoon Maureen Tan, Singapore (SG); Ting Ting Lin, Singapore (SG); Yang Choo Chua, Singapore (SG); Weng Weei Tjiu, Singapore (SG); Chaobin He, Singapore (SG); Pui Kwan Wong, Singapore (SG)

(73) Assignee: Agency for Science Technology and Research, Connexis (SG)

( * ) Notice: Subject to any disclaimer, the term of this patent is extended or adjusted under 35 U.S.C. 154(b) by 0 days.

(21) Appl. No.: 13/757,955

(22) Filed: Feb. 4, 2013

(65) Prior Publication Data

US 2014/0046005 A1 Feb. 13, 2014

(30) Foreign Application Priority Data

Feb. 2, 2012 (SG) ................. 201200761-3

(51) Int. Cl.
*C08G 63/91* (2006.01)
*C08G 63/08* (2006.01)
*C08F 230/08* (2006.01)
*C08L 67/04* (2006.01)

(52) U.S. Cl.
CPC .............. *C08L 67/04* (2013.01); *C08G 63/912* (2013.01); *C08G 63/91* (2013.01); *Y10S 525/932* (2013.01)
USPC ........... 525/450; 525/417; 525/418; 525/932; 526/279; 528/271; 528/354

(58) Field of Classification Search
None
See application file for complete search history.

(56) References Cited

U.S. PATENT DOCUMENTS

2010/0159011 A1* 6/2010 Lian et al. ................ 424/487

OTHER PUBLICATIONS

"Stable Dispersions of Hybrid Nanoparticles Induced by Stereocomplexation between Enantiomeric Poly(lactide) Star Polymers" authored by Tan et al. and published in Langmuir (2011), 27, 10538-10547.*
Abstract for KR 2009084144 (Aug. 2009).*
Abstract for CN 10875755 (Nov. 2010).*

* cited by examiner

*Primary Examiner* — Marc Zimmer
(74) *Attorney, Agent, or Firm* — Conley Rose, P.C.

(57) ABSTRACT

Described herein are polymers comprising a polyester and at least one polyhedral oligomeric silsesquioxane, wherein the polyester is capable of forming a stereocomplex with a polymer comprising a complimentary polyester and composites thereof.

25 Claims, 10 Drawing Sheets

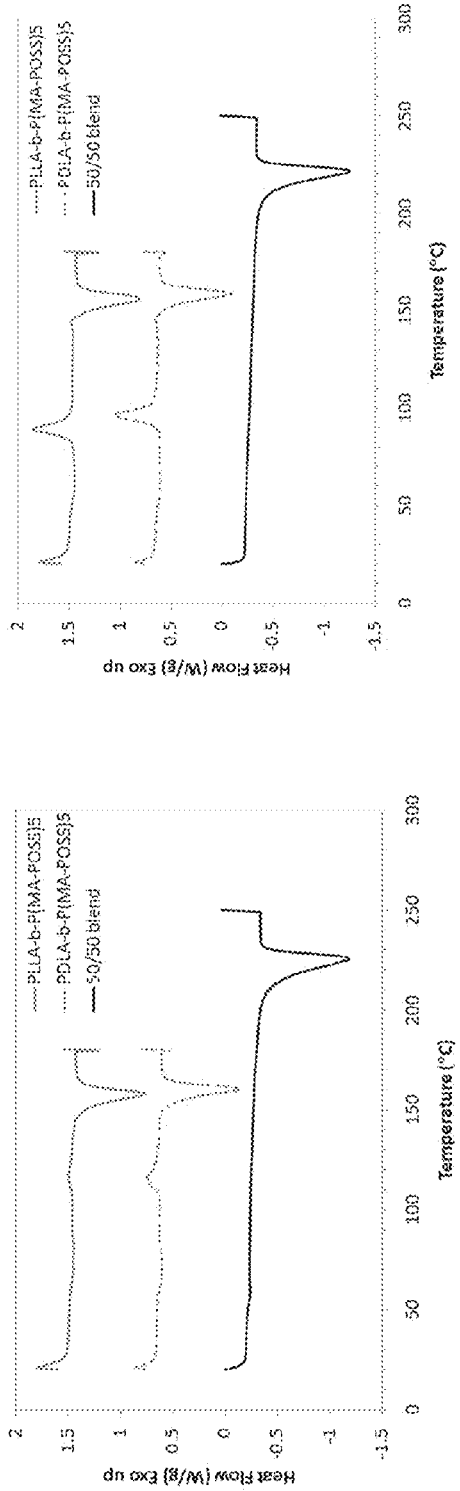
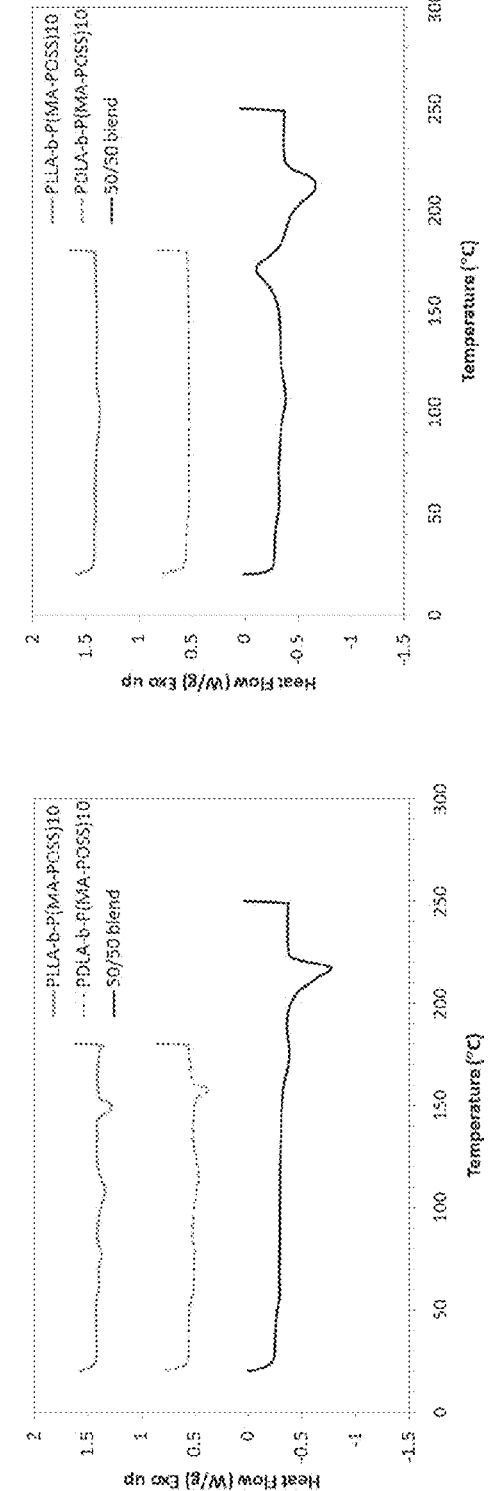
Fig. 6A
Fig. 6B
Fig. 6C
Fig. 6D

HYBRID POLYMERS

TECHNICAL FIELD

The present disclosure relates to polymers that contain monomer species capable of forming stereocomplexes with each other. The polymers described herein can be used, for example, to improve the physical properties of thermoplastic composites.

BACKGROUND

Polyester polymers have developed considerable interest due to their excellent physical properties and low manufacturing costs. However, many of the most widely used polyester polymers, such as polyethylene terephthalate, are not biodegradable and can have long lasting environmental consequences.

To cope with these problems, much effort has been focused on developing polymer materials that, when discarded and left in the environment, are naturally degraded by microorganisms and/or other natural factors into harmless materials.

A number of biodegradable polyester polymers have been developed from naturally derived feed stocks as well as synthetic or semi-synthetic precursors.

One such biodegradable polyester is polylactic acid (or polylactide), which has garnered considerable interest owing to the fact that it can be mass-produced from renewable resources, such as corn starch and sugar cane and its useful physical properties.

Enantiopure polylactic acid is a crystalline thermoplastic material that has tensile strength equivalent to that of polyethylene and transparency equivalent to that of polyethylene terephthalate. Importantly, polylactic acid readily degrades when discarded in the environment into lactic acid, carbon dioxide, and water, all of which are essentially environmentally harmless.

Despite the many desirable physical properties exhibited by polylactic acid, its inherent brittleness and notch sensitivity pose a considerable scientific challenge and limit its large-scale application as a structural material.

Accordingly, there exists a need to develop methods for toughening polyester polymers, such as polylactic acid, which do not compromise the strength, stiffness, and transparency of the polymer.

SUMMARY

According to a first aspect, there is provided a polymer comprising a polyester and at least one polyhedral oligomeric silsesquioxane, wherein the polyester is capable of forming a stereocomplex with a polymer comprising a complimentary polyester.

According to a second aspect, there is provided a stereocomplex comprising at least one polymer as described in the first aspect above.

According to a third aspect, there is provided a composite comprising at least one polymer of the first aspect above and at least one matrix polymer.

The polymers described herein are capable of forming stereocomplexes with polymers comprising complimentary polyesters. These stereocomplexes can be used to enhance the mechanical properties, the thermal resistance, and the hydrolysis resistance of polyester thermoplastic composites comprising them.

Advantageously, the polymers described herein can be used to improve the toughness of a matrix polymer, such as polyester, without effecting the strength, stiffness, and transparency of the matrix polymer.

Furthermore, by controlling the strength of the interfacial interactions between the polymers described herein and the matrix polymer, the morphology and fracture characteristics of the formed composite can be predictably controlled and the tensile strength of the composite can be improved.

According to a fourth aspect, there is provided a method comprising the steps of contacting a polymer as described in the first aspect above with a polymer comprising a complimentary polyester under conditions that favor stereocomplexation, thereby forming a stereocomplex comprising the polymer as described in the first aspect above and the polymer comprising a complimentary polyester.

DEFINITIONS

The following words and terms used herein shall have the meaning indicated:

As used herein, the term "alkyl group" includes within its meaning monovalent ("alkyl") and divalent ("alkylene") straight chain or branched, chain saturated aliphatic groups having from 1 to 10 carbon atoms, eg, 1, 2, 3, 4, 5, 6, 7, 8, 9, or 10 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "alkenyl group" includes within its meaning monovalent ("alkenyl") and divalent ("alkenylene") straight or branched chain unsaturated aliphatic hydrocarbon groups having from 2 to 10 carbon atoms, eg, 2, 3, 4, 5, 6, 7, 8, 9, or 10 carbon atoms and having at least one double bond, of either E, Z, cis or trans stereochemistry where applicable, anywhere in the alkyl chain. Examples of alkenyl groups include but are not limited to ethenyl, vinyl, allyl, 1-methylvinyl, 1-propenyl, 2-propenyl, 2-methyl-1-propenyl, 2-methyl-1-propenyl, 1-butenyl, 2-butenyl, 3-butentyl, 1,3-butadienyl, 1-pentenyl, 2-pententyl, 3-pentenyl, 4-pentenyl, 1,3-pentadienyl, 2,4-pentadienyl, 1,4-pentadienyl, 3-methyl-2-butenyl, 1-hexenyl, 2-hexenyl, 3-hexenyl, 1,3-hexadienyl, 1,4-hexadienyl, 2-methylpentenyl, 1-heptenyl, 2-heptentyl, 3-heptenyl, 1-octenyl, 1-nonenyl, 1-decenyl, and the like.

The term "alkynyl group" as used herein includes within its meaning monovalent ("alkynyl") and divalent ("alkynylene") straight or branched chain unsaturated aliphatic hydrocarbon groups having from 2 to 10 carbon atoms and having at least one triple bond anywhere in the carbon chain. Examples of alkynyl groups include but are not limited to ethynyl, 1-propynyl, 1-butynyl, 2-butynyl, 1-methyl-2-butynyl, 3-methyl-1-butynyl, 1-pentynyl, 1-hexynyl, methylpentynyl, 1-heptynyl, 2-heptynyl, 1-octynyl, 2-octynyl, 1-nonyl, 1-decynyl, and the like.

The term "cycloalkyl" as used herein refers to cyclic saturated aliphatic groups and includes within its meaning monovalent ("cycloalkyl"), and divalent ("cycloalkylene"), saturated, monocyclic, bicyclic, polycyclic or fused polycyclic hydrocarbon radicals having from 3 to 10 carbon atoms, eg, 3, 4, 5, 6, 7, 8, 9, or 10 carbon atoms, Examples of cycloalkyl groups include but are not limited to cyclopropyl, 2-methylcyclopropyl, cyclobutyl, cyclopentyl, 2-methylcyclopentyl, 3-methylcyclopentyl, cyclohexyl, and the like.

The term "aromatic group", or variants such as "aryl" or "arylene" as used herein refers to monovalent ("aryl") and divalent ("arylene") single, polynuclear, conjugated and fused residues of aromatic hydrocarbons having from 6 to 10 carbon atoms. Examples of such groups include phenyl, biphenyl, naphthyl, phenanthrenyl, and the like.

The term "aralkyl" as used herein, includes within its meaning monovalent ("aryl") and divalent ("arylene"), single, polynuclear, conjugated and fused aromatic hydrocarbon radicals attached to divalent, saturated, straight and branched chain alkylene radicals.

The term "optionally substituted" as used herein means the group to which this term refers may be unsubstituted, or may be substituted with one or more groups independently selected from alkyl, alkenyl, alkynyl, thioalkyl, cycloalkyl, cycloalkenyl, heterocycloalkyl, halo, carboxyl, haloalkyl, haloalkynyl, hydroxyl, alkoxy, thioalkoxy, alkenyloxy, haloalkoxy, haloalkenyloxy, nitro, amino, nitroalkyl, nitroalkenyl, nitroalkynyl, nitroheterocyclyl, alkylamino, dialkylamino, alkenylamine, alkynylamino, acyl, alkenoyl, alkynoyl, acylamino, diacylamino, acyloxy, alkylsulfonyloxy, heterocycloxy, heterocycloamino, haloheterocycloalkyl, alkylsulfenyl, alkylcarbonyloxy, alkylthio, acylthio, phosphorus-containing groups such as phosphono and phosphinyl, aryl, heteroaryl, alkylaryl, alkylhetercaryl, cyano, cyanate, isocyanate, —C(O)NH(alkyl), and —C(O)N (alkyl)$_2$.

The term "complimentary polyester" as used herein refers to a polyester that is capable of forming a stereocomplex with the polyester contained in the reference compound. In certain embodiments, the complimentary polyester can comprise an enantiomeric isomer of the polyester present in the reference compound. In certain embodiments, the complimentary polyester can comprise a stereotactic isomer of the polyester present in the reference compound.

The term "stereocomplex", "stereocomplexation", and the like as used herein refers to the association or complexation of two or more polymers having different tacticities and/or configurations, which prevails over the association or complexation of polymers of the same tacticity and/or configuration. This association between one or more polymers results in the formation of a complex.

A "homo-stereocomplex" refers to a complex of two or more polymers having the same structure, but differing in tacticity and/or configuration.

A "hetero-stereocomplex" refers to a complex of two or more polymers having different chemical structures.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Disclosure of Optional Embodiments

Exemplary, non-limiting embodiments of a polymer, a composite comprising the polymer and a method of preparation thereof will now be disclosed.

The polymers described herein can comprise a polyester and at least one polyhedral oligomeric silsesquioxane, wherein the polyester is capable of forming a stereocomplex with a polymer comprising a complimentary polyester.

The polymer can be an alternating copolymer, periodic copolymer, a statistical copolymer, a random copolymer, a block copolymer, or combinations thereof. The polymer can be a block copolymer. In certain embodiments, the block copolymer is a diblock, triblock, tetrablock, or pentablock copolymer.

In certain embodiments, the polymer is a block copolymer, comprising a polyester block and a polyacrylate block, wherein the polyacrylate block comprises at least one polyhedral oligomeric silsesquioxane and the polyester block is capable of forming a stereocomplex with a polymer comprising a complimentary polyester block.

The polyester can have the Formula 1:

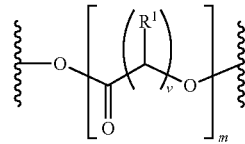

Formula 1 wherein, m is a whole number selected from about 1 to about 1,000; v is a whole number selected from about 1 to about 10; and $R^1$ is independently selected from the group consisting of hydrogen, alkyl, alkenyl, alkynyl, aralkyl, cycloalkyl, cycloalkenyl, heterocycloalkyl, and heterocycloalkenyl.

In certain embodiments, m is about 1 to about 900; about 1 to about 800; about 1 to about 700; about 1 to about 600; about 10 to about 600; about 20 to about 500; about 100 to about 500; about 200 to about 500; or about 300 to about 500.

In certain embodiments v is 1-10; 1-9; 1-8; 1-7; 1-6; 1-5; 1-4; 1-3; or 1-2. In certain embodiments, v can be 1, 2, 3, 4, 5, 6, 7, 8, 9, or 10.

In certain embodiments, $R^1$ is alkyl, cycloalkyl, aralkyl, heterocycloalkyl, heteroaryl, or heteroaralkyl. In certain embodiments, $R^1$ is alkyl or aryl. In certain embodiments, $R^1$ is methyl, ethyl, propyl, butyl, hexyl, cyclohexyl, cyclopentyl, benzyl, or phenyl.

In certain embodiments, the polyester is selected from the group consisting of:

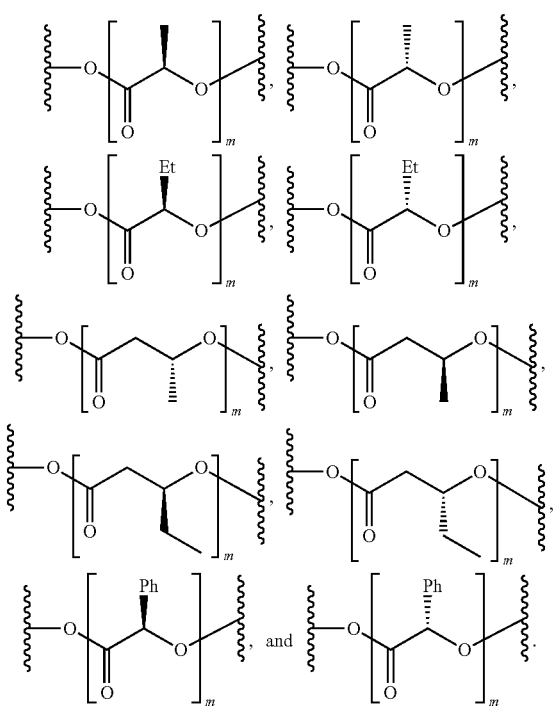

wherein m is as described herein.

The polyester can be substantially syndiotactic, substantially isotactic, or substantially heterotactic. In certain embodiments, the polyester is substantially isotactic.

In certain embodiments, at least about 99 mol %, at least about 97 mol %, at least about 95 mol %, at least about 90 mol %, at least about 85 mol %, at least about 80 mol %, at least about 70 mol %, at least about 60 mol %, at least about 50 mol %, at least about 40 mol %, at least about 30 mol %, at least about 20 mol %, or at least about 10 mol % of the repeating ester units of the polyester are the same enantiomer.

In certain embodiments, about 70 to about 100%, about 75 to about 100 mol %, about 80 about to 100 mol %, about 85 to about 100 mol %, about 90 to about 100 mol %, about 90 to about 97 mol %, or about 95 to about 97 mol % of the repeating ester units of the polyester are the same enantiomer.

In certain embodiments, the polyester contains 90 to 100 mol %, 90 to 99 mol %, or 95 to 99 mol % of an L-lactic acid unit. Other units include a D-lactic acid unit and units other than lactic acid. The total amount of the D-lactic acid unit and units other than lactic acid in the polyester can be 0 to 10 mol %, 1 to 10 mol %, 1 to 5 mol %.

In certain embodiments, the polyester contains 90 to 100 mol %, 90 to 99 mol %, or 95 to 99 mol % of a D-lactic acid unit. Other units include an L-lactic acid unit and units other than lactic acid. The total amount of the L-lactic acid unit and units other than lactic acid in the polyester can be 0 to 10 mol %, 1 to 10 mol %, 1 to 5 mol %.

The polyester can have a weight average molecular weight of about 1,000 to about 30,000 g/mol; about 1,000 to about 25,000 g/mol; about 1,000 to about 20,000 g/mol; about 1,000 to about 15,000 g/mol; or about 5,000 to about 15,000 g/mol.

The polyester is capable of forming a stereocomplex with a polymer comprising a complimentary polyester. In certain embodiments, the complimentary polyester can be comprise a polyester block that is enantiomeric or stereoisomeric (e.g., differing in tacticity) with the polyester of the polymer.

The stereocomplex can be a homo-stereocomplex or a hetero-stereocomplex.

In instances, where the stereocomplex is a hetero-stereocomplex, the stereocomplex can form as a result of the complexation of the polymer and a polymer comprising a polyester, such as poly(D-lactic acid), poly(L-lactic acid), poly((R)-3-hydroxybutyrate), poly((S)-3-hydroxybutyrate), poly((R)-3-hydroxyvalerate), and poly((S)-3-hydroxyvalerate).

In certain embodiments, the hetero-stereocomplex can form as the result of the complexation of a polymer as described herein and a polyester selected from the group consisting of:

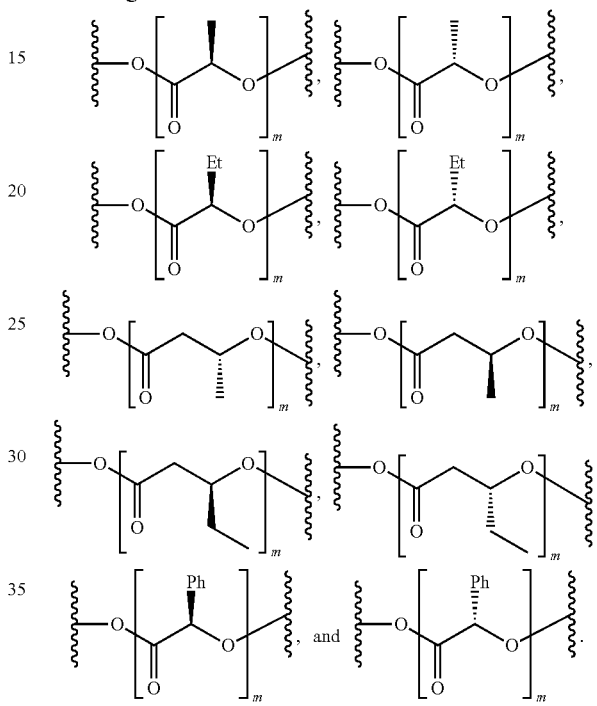

wherein m is as described herein.

In instances, where the stereocomplex is a homo-stereocomplex, the stereocomplex can result from the complexation of two polymers as described herein each comprising complimentary polyesters capable of forming a stereocomplex.

In certain embodiments, the polyhedral oligomeric silsesquioxane has the empirical formula $RSiO_{3/2}$, wherein R can be hydrogen, alkyl, alkenyl, alkynyl, aralkyl, cycloalkyl, cycloalkenyl, heterocycloalkyl, or heterocycloalkenyl. Polyhedral oligomeric silsesquioxanes can form open structures or closed, cage-like structures, such as in the shape of cubes, hexagonal prisms, octagonal prisms, and decagonal and dodecagonal prisms.

The polyhedral oligomeric silsesquioxanes can have the formula selected from the group consisting of:

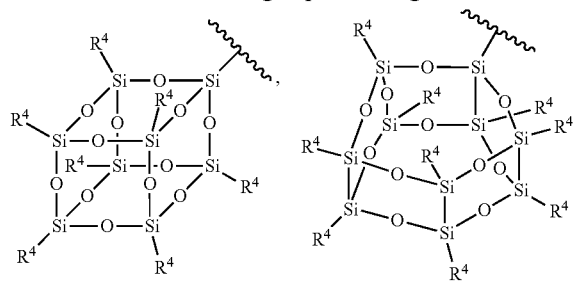

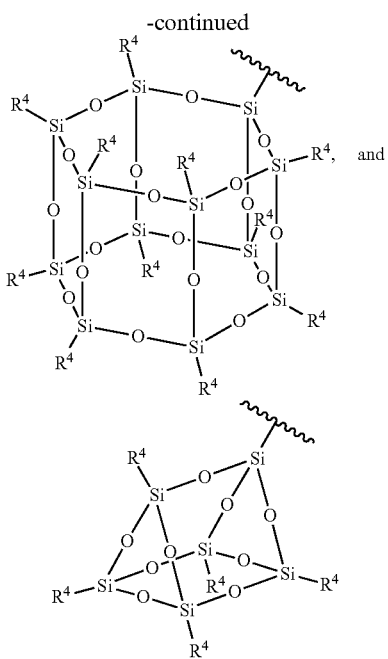

wherein $R^4$ can be hydrogen, alkyl, alkenyl, alkynyl, aralkyl, cycloalkyl, cycloalkenyl, heterocycloalkyl, or heterocycloalkenyl.

In certain embodiments, $R^4$ is methyl, ethyl, propyl, isopropyl, cyclopropyl, butyl, iso-butyl, cyclobutyl, pentyl, cyclopentyl, hexyl, cyclohexyl, isooctyl, phenyl, or benzyl.

The polyhedral oliomeric silsesquioxane can also be an open cage structure selected from the group consisting of:

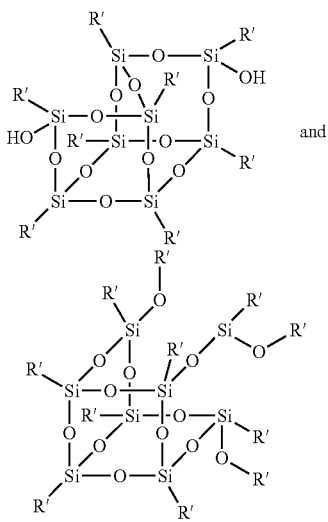

wherein R' can be $R^4$ or an attachment site to the polymer.

The polyhedral oligomeric silsesquioxane can be bonded to the polymer directly, via a linker, or as a pendant group on a polymer covalently bonded to the polymer comprising a polyester.

In instances where the polyhedral oligomeric silsesquioxane is bonded directly to the polymer, the polyhedral oligomeric silsesquioxane can be bound to the polyester via a silicon oxygen bond, e.g., by silylation of a terminal hydroxyl group or terminal carboxylic acid group on the polyester.

In instances where the polyhedral oligomeric silsesquioxane is bond to the polymer via a linker, the linker can be any linker known in the art. Examples of linkers include, but are not limited to alkyl, cycloalkyl, alkenyl, cycloalkenyl, aryl, aralkyl, heterocycloalkyl, heteroaryl, heteroaralkyl linkers optionally substituted with ethers, amides, ureas, carbamates, esters, amines, thioethers, sulfones, sulfoxides, sulfonamides, and combinations thereof.

In instances where the linker is bonded directly to the polyester, the linker can be bonded to a terminal hydroxyl or carboxyl on the polyester.

In certain embodiments, the linker can have the formula $-(CR_2)_p-$, $-[(CR_2)_qX(CR_2)_t]_p-$, or $-[(CR_2)_q(OCR_2CR_2)_t]-$, wherein p is a whole number selected from 1-100; q is an integer selected from 0-100; t is an integer selected from 0-100; R is independently selected from the group consisting of hydrogen, alkyl, aralkyl, cycloalkyl, and heterocycloalkyl; and X is $-O-$, $-OC(O)-$, $-C(O)O-$, $-N(R)-$, $-C(O)-$, $-N(R)C(O)-$, $-C(O)N(R)-$, $-SO_2-$, $-S(O)-$, $-OC(O)O-$, $-N(R)C(O)N(R)-$, $-N(R)C(O)O-$, $-OC(O)N(R)-$, $-N(R)SO2-$, or $-SO_2N(R)-$.

In certain embodiments, p is a whole number selected from 1-80; 1-60; 1-40; 1-30; 1-20; and 1-10. In certain embodiments, q is an integer selected from 0-80; 0-60; 0-40; 0-30; 0-20; and 0-10. In certain embodiments, t is an integer selected from 0-80; 0-60; 0-40; 0-30; 0-20; and 0-10.

The polymer can contain from about 1 to about 20 polyhedral oligomeric silsesquioxanes. The polyhedral oligomeric silsesquioxanes can be the same or different. In certain embodiments, the polymer has 1, 2, 3, 4, 5, 6, 7, 8, 9, 10, 11, 12, 13, 14, or 15 polyhedral oligomeric silsesquioxanes. In certain embodiments the polymer has 1-15; 1-10; or 1-5 polyhedral oligomeric silsesquioxanes.

In instances where the polyhedral oligomeric silsesquioxane is a pendant group on a polymer covalently bonded to the polymer comprising a polyester, the polymer can be represented by the Formula 2:

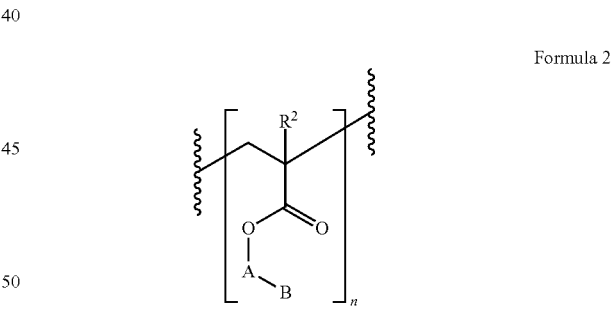

Formula 2 wherein n is a whole number selected between 1 and 20;
A is a linker as described herein;
B is the polyhedral oligomeric silsesquioxane;
R is independently selected from the group consisting of hydrogen, alkyl, alkenyl, alkynyl, aralkyl, cycloalkyl, cycloalkenyl, heterocycloalkyl, and heterocycloalkenyl; and
$R^2$ is independently selected from the group consisting of hydrogen, alkyl, alkenyl, alkynyl, aralkyl, cycloalkyl, cycloalkenyl, heterocycloalkyl, and heterocycloalkenyl.

In certain embodiments, $R^2$ is hydrogen, methyl, ethyl, or propyl.

In certain embodiments, A has the formula $-(CR_2)_p-$ or $-[CR_2CR_2(OCR_2CR_2)_q]-$; p is whole number selected from 1-20; and q is an integer selected from 0-10. In certain embodiments, A has the formula $-(CH_2)_p-$ or $-[CH_2CH_2$ $(OCH_2CH_2)_q]—$. In certain embodiments, A is $—(CH_2)_2—$, $—(CH_2)_3—$, $—(CH_2)_4—$, $—(CH_2)_5—$, or $—(CH_2)_6—$.

In certain embodiments, the polymer of Formula 2 can is represented by the Formula:

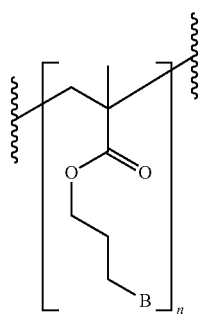

wherein n is 1-15 and B is the polyhedral oligomeric silsesquioxane.

In certain embodiments, the polymer of Formula 2 is represented by the Formula:

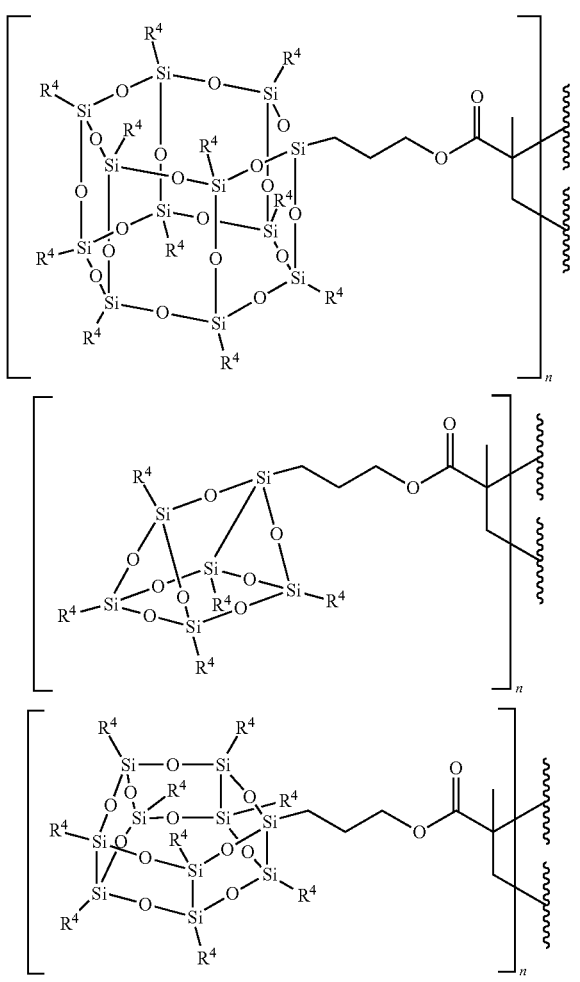

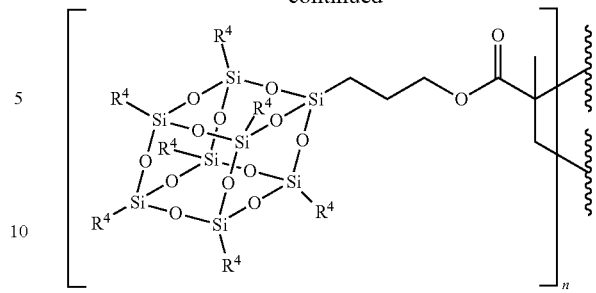

wherein n is 1-15 and $R^4$ is hydrogen, alkyl, alkenyl, alkynyl, aralkyl, cycloalkyl, cycloalkenyl, heterocycloalkyl, or heterocycloalkenyl.

The polymer of Formula 2 can be directly bonded to the polymer comprising a polyester or bonded via a linker to the polymer comprising a polyester In instances where the polymer of Formula 2 is bonded directly to the polymer comprising a polyester, the polymer of Formula 2 can be covalently attached via an oxygen carbon bond at a terminal hydroxyl or terminal carboxyl, e.g., an ether linkage or an ester linkage.

In instances where the polymer of Formula 2 is bonded via a linker to the polymer comprising a polyester, the linker can be rep resented by the Formula:

wherein $R^3$ is independently selected from the group consisting of hydrogen, alkyl, aralkyl, cycloalkyl, and aryl; or two instances of R3 taken together form a 3-7 membered cycloalkane. In certain embodiments, $R^3$ is hydrogen or alkyl. In certain embodiments, $R^3$ is methyl.

In certain instances where the polymer of Formula 2 is bonded via a linker to the polymer comprising a polyester, the polymer can comprise a polymer of Formula 3:

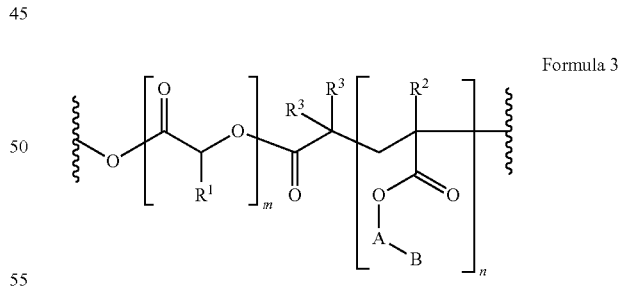

Formula 3 wherein
m is a whole number selected from 2 to 350;
n is a whole number selected between 1 and 20;
A has the formula $—(CR_2)_p—$ or $—[(CR_2)_q(OCR_2CR_2)_t]—$, wherein,
p is whole number selected from 1-20; q is an integer selected from 0-10; t is a whole selected from 1-10;
B is the polyhedral oligomeric silsesquioxane;
R is independently selected from the group consisting of hydrogen, alkyl, alkenyl, alkynyl, aralkyl, cycloalkyl, cycloalkenyl, heterocycloalkyl, and heterocycloalkenyl;

$R^1$ is independently selected from the group consisting of hydrogen, alkyl, alkenyl, alkynyl, aralkyl, cycloalkyl, cycloalkenyl, heterocycloalkyl, and heterocycloalkenyl;

$R^3$ is independently selected from the group consisting of hydrogen, alkyl, alkenyl, alkynyl, aralkyl, cycloalkyl, cycloalkenyl, heterocycloalkyl, and heterocycloalkenyl; and $R^4$ is independently selected from the group consisting of hydrogen, alkyl, aralkyl, cycloalkyl, and aryl.

In certain instances where the polymer of Formula 2 is bonded via a linker to the polymer comprising a polyester, the polymer can comprise a polymer of Formula 4:

Formula 4

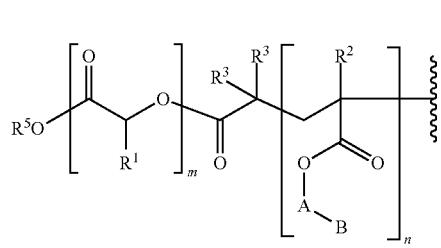

wherein m is a whole number selected from 2 to 350;

n is a whole number selected between 1 and 15;

A has the formula $-(CR_2)_p-$ or $-[(CR_2)_q(OCR_2CR_2)_t]-$, wherein, p is a whole number selected from 2-20; q is a whole selected from 1-10; t is a whole selected from 1-10:

B is the polyhedral oligomeric silsesquioxane selected from the group consisting of:

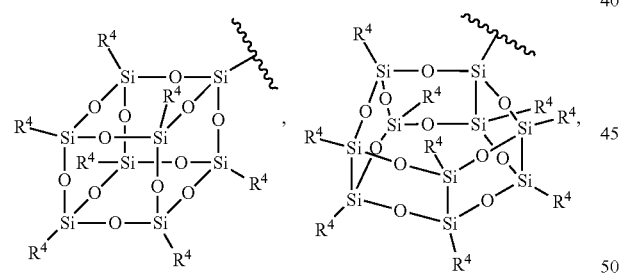

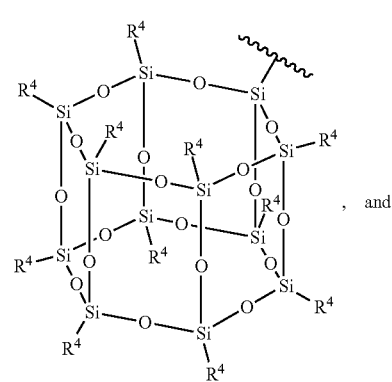

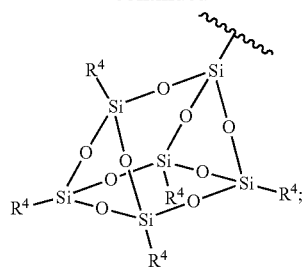

$R^2$ is independently selected from hydrogen and alkyl;

$R^3$ is independently selected from the group consisting of hydrogen, alkyl, aralkyl, cycloalkyl, and aryl;

$R^4$ is independently selected from the group consisting of hydrogen, alkyl, aralkyl, and cycloalkyl;

$R^5$ is selected from the group consisting of hydrogen, alkyl, aralkyl, cycloalkyl, heterocycloalkyl, and aryl; or has the formula $-[CR_3(OCR_2CR_2)_u]-$ wherein u is a whole number selected from 1-20; and R is independently selected from the group consisting of hydrogen, alkyl, aralkyl, cycloalkyl, and heterocycloalkyl.

In certain embodiments, $R^5$ is methyl, ethyl, or $CH-OCH_2CH_2-$.

In certain embodiments, the polymer of Formula 4 can have the formula:

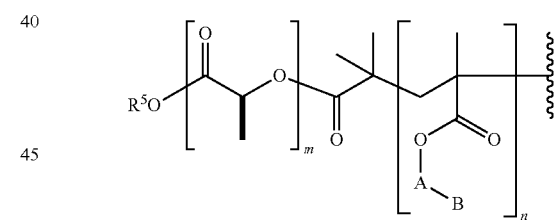

wherein m, n, A, B, and $R^5$ are as defined herein and the polyester comprises isotactic polylactic acid. In certain embodiments, the polyester comprises poly(L-lactic acid) or poly(D-lactic acid).

The polymers described herein can be readily prepared using methods well known to those of skill in the art. Convergent synthetic routes for the preparation of the polymers are preferred due to improved yield and efficiency.

Convergent synthesis of the polymers described herein can entail the preparation of the polyester component, the preparation of the compound comprising the polyhedral oligomeric silsesquioxane and the covalent attachment of the polyester component and the compound comprising the polyhedral oligomeric silsesquioxane.

Scheme 1 below illustrates a convergent route to the polymers described herein.

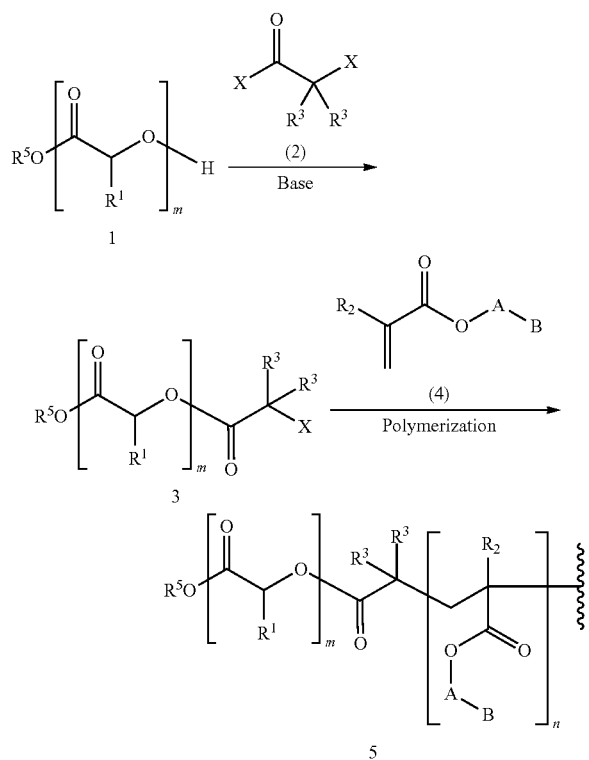

Wherein m, n, A, B, $R^1$, $R^2$, $R^3$, $R^4$, and $R^5$ are as described herein and X is halide, e.g., chloride, bromide, or iodide.

The polyester 1 can be reacted with a linking group 2, such as an alpha halo acid halide in the presence of a suitable base.

The alpha halo ester substituted polyester 3 can then be reacted with an α,β-unsaturated ester 4 in a metal mediated atom transfer radical polymerization ("ATRP") to yield the desired product 5.

A variety of polyesters are commercially available and can be used in the methods for preparing the polymers described herein. Such polyesters include, but are not limited to poly (D-lactic acid), poly(L-lactic acid), poly((R)-3-hydroxybutyrate), poly((S)-3-hydroxybutyrate), poly((R)-3-hydroxyvalerate), and poly((S)-3-hydroxyvalerate).

Polyesters can readily be synthesized by the polymerization of hydroxy substituted carboxylic acids and the ring-opening polymerization of lactones or cyclic diesters represented by the formula:

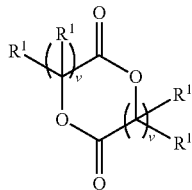

wherein v is a whole number selected from about 1 to about 10; and $R^1$ is independently selected from the group consisting of hydrogen, alkyl, alkenyl, alkynyl, aralkyl, cycloalkyl, cycloalkenyl, heterocycloalkyl, and heterocycloalkenyl.

The polymerization reaction can be carried out in a conventionally known reactor, for example, vertical reactors equipped with a high viscosity stirring blade such as helical ribbon blade, which may be used alone or in combination. An alcohol may be used as a polymerization initiator. The alcohol preferably does not impede the polymerization of polylactic acid and is nonvolatile, as exemplified by decanol, dodecanol, tetradecanol, hexadecanol, octadecanol, ethylene glycol, triethylene glycol and benzyl alcohol.

The terminal carboxylic acid unit of the polyester can be converted to an ester using standard methodologies known to those of skill in the art. For example, the carboxyl can be activated by formation of an acid chloride, mixed anhydride, or activated ester, and reacted with a suitable alcohol to form the ester. Alternatively, the carboxylic acid can be deprotonated and reacted with alkyl halide, alkyl tosylate, or the like. In another method, the carboxylic acid can be subjected to a Fischer esterification reaction in the presence of an appropriate acid to form the ester. The alpha halo ester 3 can be reacted with the α,β-unsaturated ester 4 using a living (controlled) polymerization reaction. Living polymerization reactions are useful for preparing well defined polymers with low polydispersity indices.

Living polymerization is a form of polymerization in which the ability of a growing polymer chain to terminate has been removed. Chain termination and chain transfer reactions are absent or occur at a very slow rate and the rate of radical initiation is generally much larger than the rate of chain propagation. As a result of these conditions, the polymer chain can grow at a more constant rate as compared with traditional polymerization reactions and each monomer block can be prepared sequentially.

Depending on the nature of the polymer that is desired, the appropriate living polymerization technique can be employed to prepare the polymer. Such living polymerization methods include living anionic polymerization, living cationic polymerization, living free radical polymerization, living free radical polymerization, living group-transfer polymerization, and living Ziegler-Natta polymerization.

The polymer can be prepared by atom transfer radical polymerization ("ATRP"). ATRP is an example of a living radical polymerization method, which employs the use of a transition metal catalyst to mediate the formation of carbon-carbon bonds in a highly controlled process. ATRP reactions typically employ an organic halide initiator (e.g., compound 3 of Scheme 1), an olefin monomer (e.g., compound 4 of Scheme 1), and a transition metal catalyst.

The organic halide initiator is typically an organic halide, such as a bromide or chloride (e.g., compound 3 of Scheme 1). Organic bromides tend to be more reactive and provide better results than organic chlorides. Typical organic halides include, but are not limited to alkyl halides, benzyl halides, α-halo esters, and α-halo amides.

Any organic halide initiator can be used in the preparation of the copolymers described herein. The organic halide initiator can comprise an alkyl halide, a benzyl halide, or an α-halo ester.

The organic halide initiator can be represented by a compound of Formula 5

Formula 5

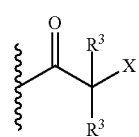

wherein X can be chloride or bromide; and $R^3$ can be alkyl, aralkyl, cycloalkyl, or heterocycloalkyl.

A broad range of transition metals can be used to catalyze ATRP reactions. Such transition metals include, but are not limited to Group IV metals, such as Ti, Group VI metals, such as Mo, Group VII metals, such as Re, Group VIII metals, such as Fe, Ru, and Os, Group IX metals, such as Rh and Co, Group X metals, such as Ni and Pd, and group XI metals, such as Cu.

The catalyst counterion can be a halide ion, a pseudohalide, a carboxylate, triflate, or hexafluorophosphate.

The transition metal, e.g., copper, can be complexed with a nitrogenous ligand, such as derivatives of bidentate bipyridine (bpy) and pyridine imine, tridentate diethylenetriamine (DETA), and tetradentate tris[2-aminoethyl]amine (TREN), 1,1,4,7,10,10-hexamethyltriethylenetetramine, N,N,N',N',N''-pentamethyldiethylenetriamine (PMDTA), and tetraazacyclotetradecane (CYCLAM).

The olefin monomer can be a monomer represented by compound 4 (of Scheme 1). In the examples below, the compound 4 has the formula:

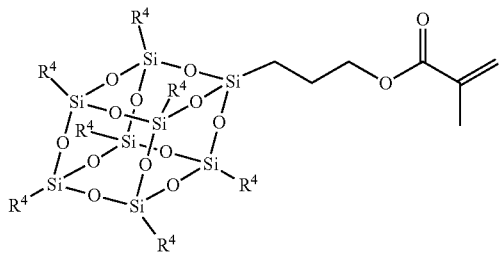

wherein $R^4$ is iso-butyl.

ATRP reactions can be conducted in a broad range of solvents, such as benzene, toluene, xylene, tetrahydrofuran, 1,4-dioxane, anisole, dimethylformamide, dimethylsulfoxide, water, alcohols, such as methanol, ethanol, and isopropanol, acetonitrile, chloroform, and combinations thereof. In the examples below, the ATRP reaction is conducted in tetrahydrofuran.

The ATRP reaction can be conducted by contacting the organic halide initiator, the first monomer present in the desired polymer, and the transition metal catalyst under the appropriate reaction conditions for the ATRP reaction. The transition metal catalyst first reacts with the organic halide initiator to form an organometallic intermediate. This intermediate can then sequentially react by inserting into the double bond of the monomer to form a new carbon-carbon between the initiator and the monomer and carbon metal bond with the catalyst. This newly formed intermediate can continue to sequentially react with monomers by inserting into the olefin of additional monomer present in the reaction. In this way, the polymer chain continues to grow in length until substantially all of the first monomer is consumed in this fashion. After the first monomer is substantially consumed, if desired, a second monomer can be introduced into the reaction vessel and the second block of the polymer can be built in the same fashion. This process can be repeated until the polymer has the desired number of blocks. Once the desired number of blocks has been achieved the reaction is stopped and the desired product is isolated as a copolymer containing the organic initiator at a terminal end of the block copolymer and a transition metal residue, e.g., a halide, at the proximal end of the polymer.

If desired, the transition metal residue can be removed or chemically modified, e.g., the halide can be reacted with a reducing agent to replace it with hydrogen.

The polymers described herein further can comprise a catalyst residue covalently attached at a terminal end of the polymer as illustrated in the figure below.

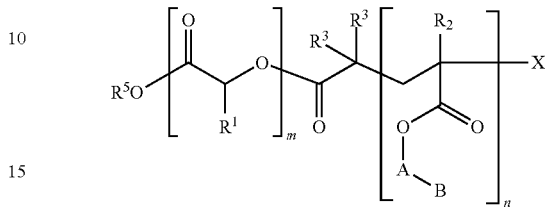

wherein m, n, A, B, $R^1$, $R^2$, $R^3$, $R^4$, and $R^5$ are as described herein and the catalyst residue X can be selected from chloride, bromide, or iodide.

Advantageously, the polymers prepared using ATRP reactor can have a very low polydispersity index (PDI). The PDI of the polymer can be from about 1 to about 2; about 1 to about 1.8; about 1 to about 1.6; about 1 to about 1.5; about 1 to about 1.4; about 1 to about 1.3; about 1 to about 1.2, or about 1 to about 1.1.

The polymers described herein can form stereocomplexes when combined with a compound comprising a complimentary polyester. The compound comprising a complimentary polyester can be a second polymer as described herein or a polyester polymer.

The formed stereocomplex can be used to improve the physical properties of polyester polymers, such as polylactic acid.

The stereocomplex can be prepared by mixing together a polymer as described herein and a polymer containing a complimentary polyester in a predetermined weight ratio under conditions that favor stereocomplexation, thereby forming the stereocomplex.

In instances where the stereocomplex comprises two polymers as described herein containing complimentary polyesters, the two polymers as described herein can be present in a ratio of 1:100 to 100:1 (mol:mol). Suitable ratios include but are not limited to about 10:1 to about 1:10; about 5:1 to about 1:5; about 3:1 to about 1:3; about 2:1 to about 1:2; about 1.5:1 to about 1:1.5; or about 1.25:1 to about 1.25:1; about 1.1:1 to about 1:1.1; or about 1:1.

The mixing can be carried out in the presence of a solvent. The solvent is not particularly limited if it can substantially dissolve the polymer described herein and the polymer containing a complimentary polyester. Examples of suitable solvents include, but are not limited to dichloromethane, chloroform, dichloroethane, tetrachloroethane, tetrahydrofuran, dioxane, sulfolane, N-methylpyrrolidone, N,N-dimethylacetamide, and dimethylformamide, which can be used alone or in combination.

Upon formation of the stereocomplex, it can be isolated from the reaction solvent using traditional purification techniques, such as filtration and or solvent evaporation.

The mixing may be carried out in the absence of a solvent. That is, the polymer described herein and the polymer containing a complimentary polyester are melt blended together. Predetermined amounts of the polymer described herein and the polymer containing a complimentary polyester are mixed together and then melt kneaded together, or a method in which any one of them is molten and then the other is added to and kneaded with the molten material can be employed.

Also provided is a composite comprising at least one polymer described herein and at least one matrix polymer.

The matrix polymer can be a polyester, including but not limited to aliphatic polyesters, such as polyglycolic acid, poly(D-lactic acid), poly(L-lactic acid), poly((R)-3-hydroxybutyrate), poly((S)-3-hydroxybutyrate), poly((R)-3-hydroxyvalerate), poly((S)-3-hydroxyvalerate), polycaprolactone, polyethylene adipate, polyesteramide, polybutylene succinate adipate, polyhydroxyalkanoates, polyhydroxybutyrate, and aromatic polyesters, such as poly((R)-mandelic acid), poly((S)-mandelic acid), polyethylene terephthalate, polybutylene terephthalate, polytrimethylene terephthalate, polyethylene naphthalate, and vectran.

The polymer described herein can be present in the composite at about 1% to about 50% by weight. In certain embodiments the composite comprises at least about 1%, at least about 2%, at least about 3%, at least about 4%, at least about 5%, at least about 6%, at least about 7%, at least about 8%, at least about 9%, at least about 10%, at least about 15%, at least about 17%, at least about 20%, at least about 25%, at least about 30%, at least about 40%, at least about 50% by weight of the polymer described herein. In certain embodiments, the polymer described herein is present in the composite at about 1% to about 20%, at about 1% to about 15%, at about 1% to about 10%, at about 1% to about 70%, at about 1% to about 5%, or at about 1% to about 3% by weight.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 2 comprises FIGS. 2A and 2B.

FIG. 4 comprises FIGS. 4A, 4B and 4C.

FIG. 5 comprises FIGS. 5A and 5B.

FIG. 6 comprises FIGS. 6A, 6B, 6C and 6D. FIG. 6A and FIG. 6B respectively show DSC thermograms of the 1$^{st}$ and 2$^{nd}$ heat scans of PLLA-b-P(MA-POSS)$_5$, PDLA-b-P(MA-POSS)$_5$, and their 1:1 blend. FIG. 6C and FIG. 6D respectively show DSC thermograms of the 1$^{st}$ and 2$^{nd}$ heat scans of PLLA-b-P(MA-POSS)$_{10}$, PDLA-b-P(MA-POSS)$_{10}$ and their 1:1 blend.

FIG. 7 comprises FIGS. 7A and 7B.

FIG. 8 comprises FIGS. 8A, 8B and 8C.

FIG. 9 comprises FIGS. 9A and 9B.

EXAMPLES

Non-limiting examples of the present disclosure will be further described, which should not be construed as in any way limiting the scope of the disclosure.

Methacrylisobutyl polyhedral oligomeric silsesquioxane (POSS) (MA-POSS) was purchased from Hybrid Plastics (product #: MA0702) and used without further purification. Triethylamine (Fisher, 99.7%) was dried over molecular sieves before use. 2-bromoisobutyryl bromide (98%) CuBr (99.99%), N,N,N,N,-pentamethyldiethylenetriamine (PMDETA) (99%, anhydrous tetrahydrofuran (99.9%) and dichloromethane (99.9%), were purchased from Aldrich and used without further purification. PLLA monomethoxy terminated ($M_n$=6000 g/ml) (product #: P7151A-LA) and PDLA, monomethoxy terminated ($M_n$=6000 g/mol) (product #: P5764-LA) were purchased from Polymer Source Inc. and dried under vacuum before use.

Nuclear magnetic resonance ($^1$H-NMR) spectra were recorded on a Bruker 400 MHz spectrometer.

Gel-permeation chromatography (GPC) was conducted on a Waters 2690 fitted with an evaporative light scattering detector (Waters 2420) and three phenomenox linear 5 mm styragel columns (500, 10$^4$ and 10$^6$ Å) were used in the system.

Diffractive light scattering (DLS) measurements were made at 25° C. using a Brookhaven BI-200SM multi-angle goniometer equipped with a BI-APD detector. The light source was a 35 mW He—Ne laser emitting vertically polarized light of 632.8 nm wavelength.

Transmission electron microscopy (TEM) measurements were conducted using a JEOL 2100 transmission electron. microscope operating at an acceleration voltage of 200 kV.

Differential scanning calorimetry (DSC) measurements were conduced using a TA Instruments DSC-Q100 using nitrogen as purge gas. Samples were heated up with a ramp of 10° C./min from 25° C. to 250° C.

Wide-angle X-ray scattering (WAXS) measurements were done at room temperature using a Bruker D8 General Area Detector Diffraction System equipped with a CuKα source (λ=0.1542 nm) operating at 40 kV and 40 mA.

Example 1

Synthesis of Hybrid Block Copolymers of PLLA-b-P(MA-POSS) and PDLA-b-P(MA-POSS) Using Atom Transfer Radical Polymerization (ATRP)

PLLA or PDLA ($8.0 \times 10^{-4}$ mol) was dissolved in dried dichloromethane (DCM) (~80 mL) under argon in a two neck round bottom flask equipped with a magnetic stirrer bar. Triethylamine ($4.0 \times 10^{-3}$ mol) was then added with a syringe and the solution was cooled in an ice/salt mixture before a stoichiometric amount of 2-bromoisobutyrylbromide was added drop wise. The reaction was allowed to continue overnight under argon atmosphere at room temperature.

The reaction product was then filtered, precipitated in methanol and centrifuged at 10000 RPM. This process was repeated several times with fresh batches of methanol. The product was finally dried under vacuum at 40° C. overnight.

Figure 1:
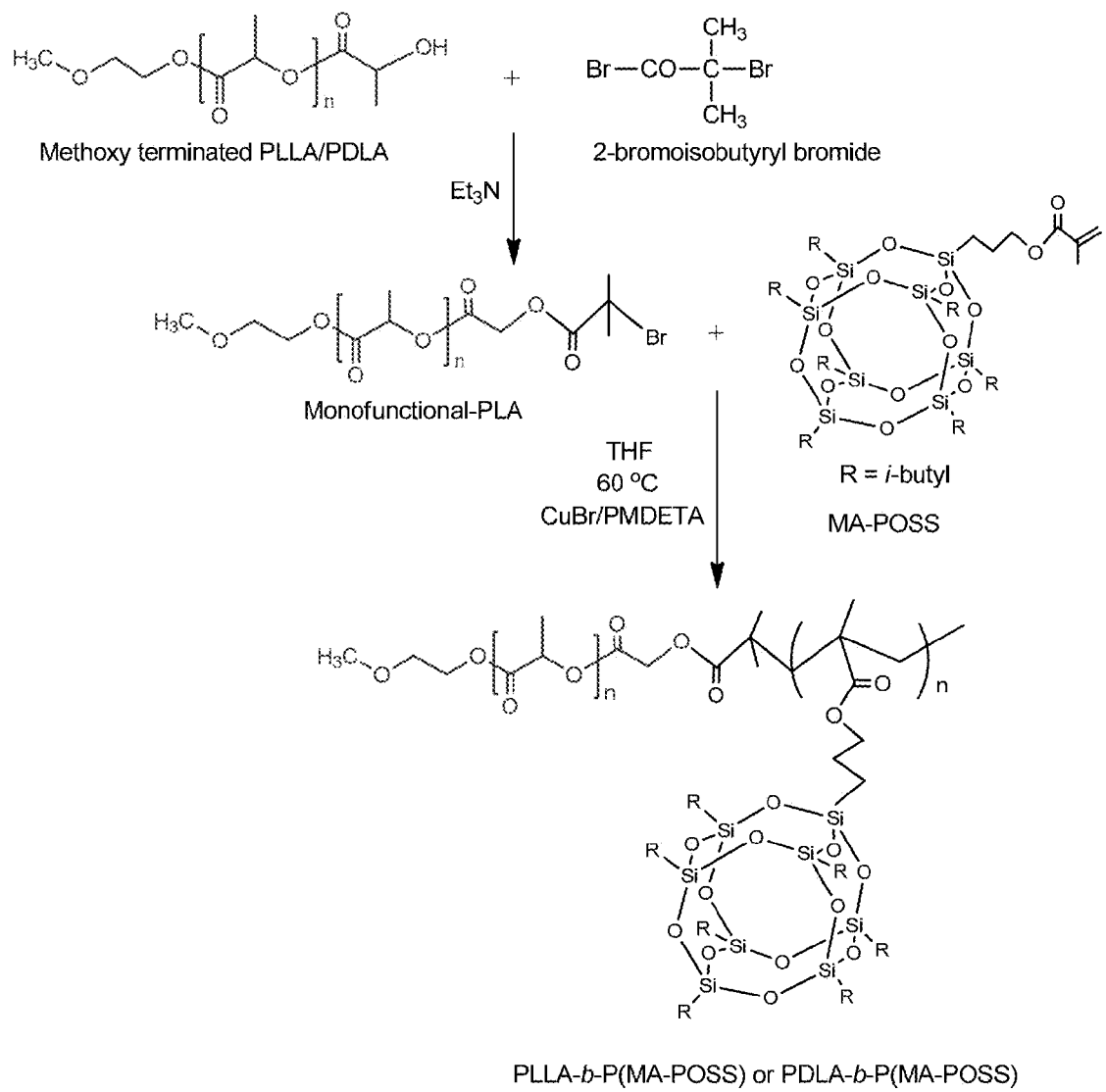
FIG. 1 is a schematic diagram showing the steps involved in the synthesis of PLLA-b-P(MA-POSS) and PDLA-b-P(MA-POSS) block copolymers via ATRP.

In a second step, PLLA or PDLA macroinitiator (0.19 mmol (Br)), methacryloisobutyl POSS (MA-POSS) (1.92 mmol), and anhydrous THF (~4 mL) were added to a schlenk tube. The mixture was deoxygenated by three freeze-pump-thaw cycles, followed by the addition of CuBr (0.19 mmol) and PMDETA (0.19 mmol) under argon. The contents were subjected to two more freeze-pump-thaw cycles to ensure complete oxygen removal. The Schlenk tube was then transferred to an oil bath maintained at 60° C. for approximately twenty hours. The reaction was finally stopped by exposing to air and diluting with THF. The product solution was passed through an alumina column to remove copper catalyst. To remove unreacted MA-POSS, the crude product was dispersed in hexane and centrifuged at 10000 RPM. This process was repeated several times with fresh batches of hexane. Finally, the product was dried under vacuum at 40° C. overnight. FIG. 1 provides a schematic diagram showing the overall synthesis process.

Example 2

Nuclear Magnetic Resonance (NMR) Spectroscopic Studies of Purified PLLA-b-P(MA-POSS) Copolymer in d-Chloroform $^1$H-NMR spectroscopic studies were carried out on purified PLLA-b-P(MA-POSS) copolymer in d-chloroform. The NMR spectrum resulting from the studies as provided in FIG. 2 confirms the presence of protons from both the PLLA and P(MA-POSS) blocks. Signal e at approximately 5.2 ppm can be assigned to the methine proton (CH) of the PLLA backbone. Resonances observed at approximately δ=0.58-0.60 ppm can be assigned to the methylene protons (c and d) of the P(MA-POSS) block, Methyl protons (a) and methine protons (b) of the isobutyl groups in MA-POSS, identified at approximately δ=0.95 ppm and 1.9 ppm respectively, indicate that successful chain extension had occurred. The composition and hence the degree of polymerization of the P(MA-POSS) block can be estimated by comparing the integral values of signals representing the protons (e) of PLA and protons (c and d) of the P(MA-POSS) block.

Example 3

Figure 2A:
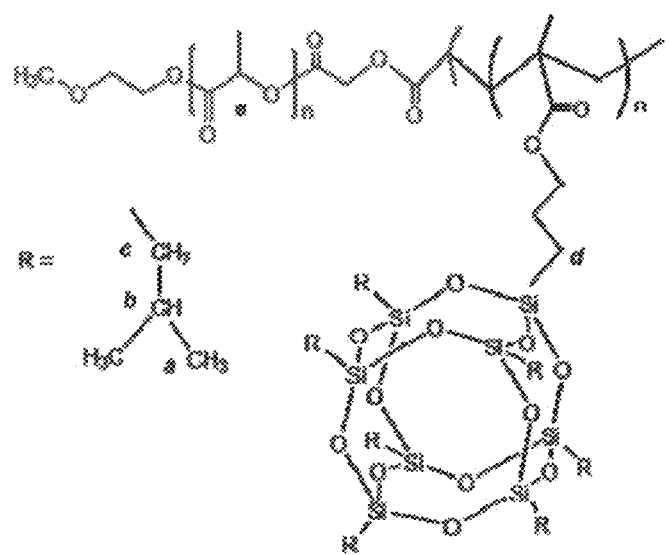
FIG. 2A shows the chemical structure of the PLLA-b-P(POSS-MA)$_n$ diblock copolymer.
Figure 2B:
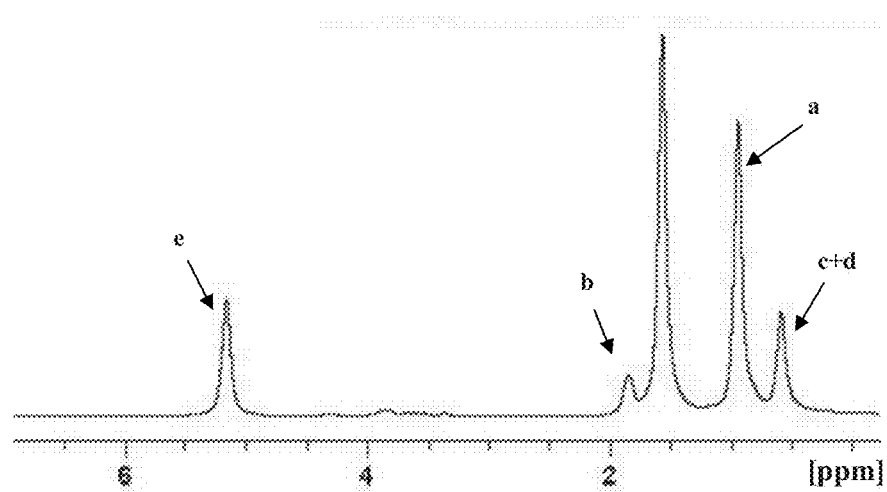
FIG. 2B shows a representative $^1$H NMR spectrum and assignment of the respective peaks of the same diblock copolymer in d-chloroform.
Figure 3:
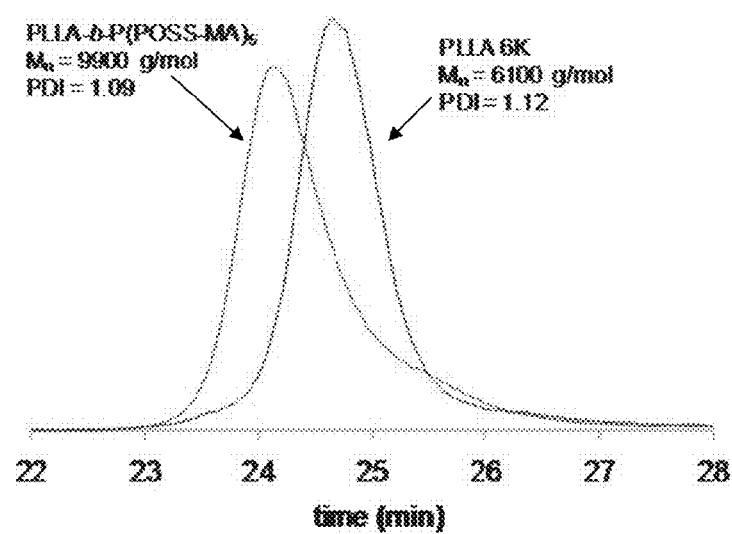
FIG. 3 shows the GPC profiles of PLLA macroinitiator and the obtained PLLA-b-P(MA-POSS).

Gel Permeation Chromatography (GPC) Studies of the Macroinitiator PLLA and Subsequent PLLA-b-P(MA-POSS) Block Copolymers GPC studies were carried out on the macrointiator PLLA and subsequent PLLA-b-P(MA-POSS) block copolymers. The resulting GPC profiles of the macroinitiator PLLA and the subsequent PLLA-b-P(MA-POSS) block copolymers are shown in FIG. 2. A significant shift in the GPC trace of the PLLA macroinitiator (to a higher molecular weight) indicates successful chain extension. More importantly, the monomodal molecular weight distributions and low values of polydispersity index (PDI) obtained for the block copolymer indicates the formation of well-defined PLLA-b-P(MA-POSS) and PDLA-b-P(MA-POSS) block copolymers with a narrow molecular weight distribution.

Example 4

Dynamic Light Scattering (DLS) in the Solution Blending and Stereocomplex Formation of PLLA-b-P(MA-POSS) and PDLA-b-P(MA-POSS)

A study based on the dynamic laser light scattering (DLS) in the solution blending and stereocomplex formation of PLLA-b-P(MA-POSS) and PDLA-b-P(MA-POSS) was carried out.

Figure 4A:
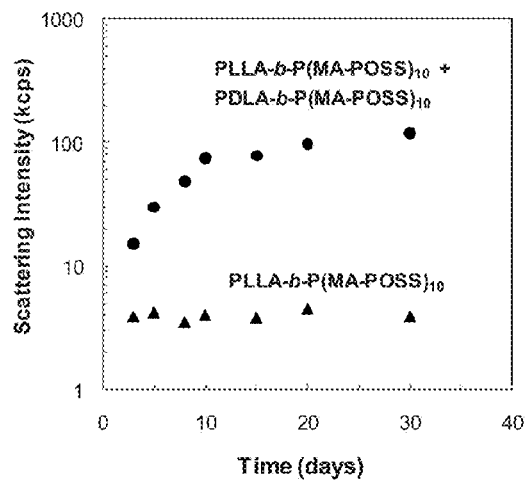
FIG. 4A shows the scattering intensity from DLS measurements as a function of time (days) of individual PLLA-b-P(MA-POSS)$_{10}$ solution and a mixture of PLLA-b-P(MA-POSS)$_{10}$ with PDLA-b-P(MA-POSS)$_{10}$, both at copolymer concentrations of 1.0 mg/mL in THF.

The individual block copolymers to be tested were first dissolved in THF at room temperature to give clear solutions at a concentration of 1.0 mg/mL. FIG. 4A shows that the scattering intensity of the PLLA-b-P(MA-POSS) copolymer solution, measured using dynamic light scattering (DLS) at an angle of 90°, is relatively low (approximately 5.0 kcps) and remains constant with time (over 30 days). This suggests that at a concentration of 1.0 mg/mL, aggregation is not observed in the individual copolymer solution.

Figure 4B:
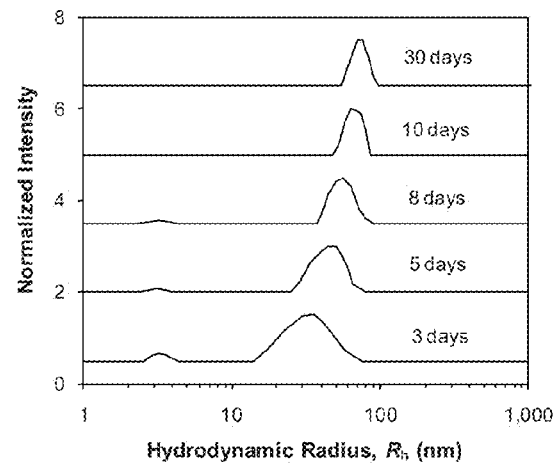
FIG. 4B shows the distribution of the hydrodynamic radius $R_h$, of stereocomplex aggregates in a mixture of PLLA-b-P(MA-POSS)$_{10}$ and PDLA-b-P(MA-POSS)$_{10}$ over a 30-day period and prepared at a copolymer concentration of 1.0 mg/mL.

Fresh solutions of PLLA-b-P(MA-POSS) and PDLA-b-P(MA-POSS) were then prepared by separately dissolving an equivalent weight of each copolymer in THF at room temperature. The initial solutions were then filtered through filters (Whatman Anotop, porosity 0.2 μm) before they were mixed to form the stereocomplex. In contrast with the scattering intensities of the solutions of the individual copolymers, the scattering intensity of the mixture of PLLA-b-P(MA-POSS) and PDLA-b-P(MA-POSS) increased steadily for approximately 10 days and then appears to remain constant at approximately 100 kcps (depicted in FIG. 4A). It is worth emphasizing that under the experimental conditions, the only driving force for self-assembly to occur is the formation of stereocomplex aggregates between the PLLA and PDLA blocks of the polymers. It is also worth noting that this mixture solution remains optically clear over the 30-day period, implying the formation of stable nanoparticles in solution. FIG. 4B shows the size distribution of the hydrodynamic radius, $R_h$ of the stereocomplex aggregates in the mixture of PLLA-b-P(MA-POSS)$_{10}$ and PDLA-b-P(MA-POSS)$_{10}$ at a concentration of 1.0 mg/mL. $R_h$ is observed to increase steadily in the first ten days, beyond which an apparent equilibrium $R_h$ value of approximately 70.0±7.2 nm is reached. In addition, a bimodal distribution of $R_h$ was obtained up to the first 8 days, beyond which only a single-peak distribution was be detected. The first mode for the bimodal distribution (with dimensions around 3.2 nm) is related to the free chains; after 8 days, the scattering effect due to the growing nanoparticles became dominant over the light scattering due to the free chains and resulted in a single-peak distribution of the hydrodynamic radius.

Figure 4C:
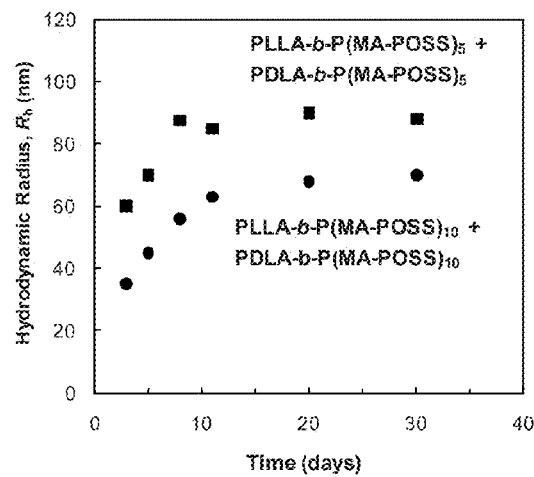
FIG. 4C shows the hydrodynamic radius $R_h$, of aggregates in mixtures of PLLA-b-P(MA-POSS)$_{10}$ and PDLA-b-P(MA-POSS)$_{10}$ and PLLA-b-P(MA-POSS)$_5$ and PDLA-b-P(MA-POSS)$_5$ as a function of time and prepared at a copolymer concentration of 1.0 mg/mL.

FIG. 4C shows the evolution of the sizes of the stereocomplex aggregates with time, wherein $R_h$ is observed to increase steadily during the first 10 days. Beyond these first 10 days, apparent equilibrium values of approximately 60 nm (PLLA-b-P(MA-POSS)$_{10}$+PDLA-b-P(MA-POSS)$_{10}$) and 85 nm (PLLA-b-P(MA-POSS)$_5$+PDLA-b-P(MA-POSS)$_5$) are observed. The dispersions remain optically clear and stable over the entire 30-day period. The larger aggregate size obtained in the mixture of PLLA-b-P(MA-POSS)$_5$+PDLA-b-P(MA-POSS) indicates that stereocomplexation in the block copolymers may be influenced by the number of POSS repeating units grafted to the PLA block.

Example 5

Figure 5A:
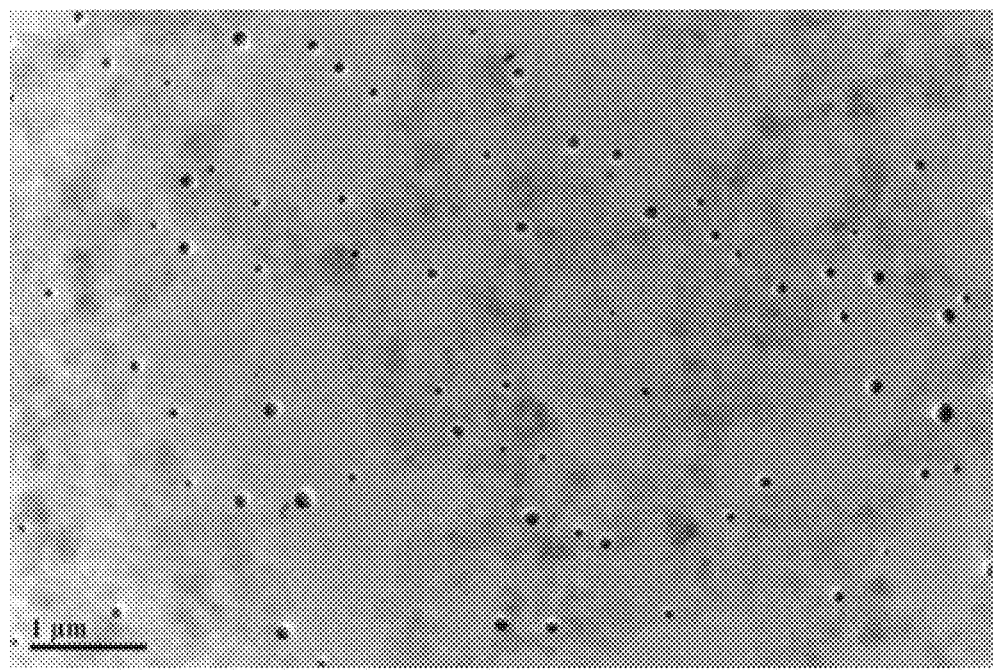
FIG. 5A and FIG. 5B are TEM micrographs of the aggregates formed in a mixture of PLLA-b-P(MA-POSS)$_{10}$ and PDLA-b-P(MA-POSS)$_{10}$ in at a copolymer concentration of 1.0 mg/mL.
Figure 5B:
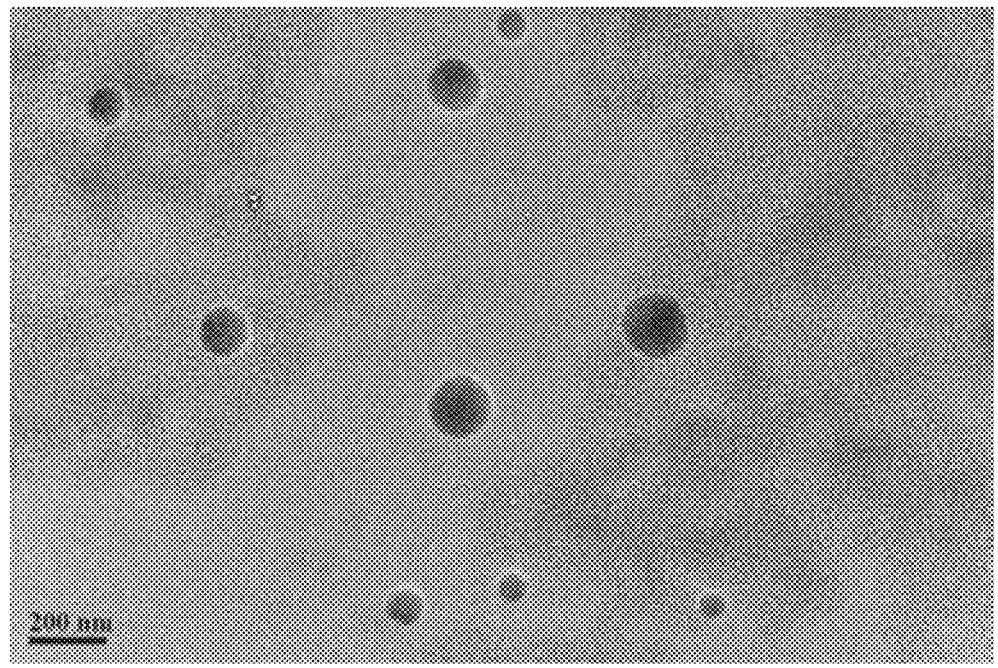

Transmission Electron Microscopy (TEM) Observations of the Mixture of PLLA-b-P(MA-POSS)$_{10}$ and PDLA-b-P(MA-POSS)$_{10}$ TEM observations of PLLA-b-P(MA-POSS)$_{10}$+PDLA-b-P(MA-POSS)$_{10}$ were carried out. The TEM micrographs of the mixture of PLLA-b-P(MA-POSS)$_{10}$+PDLA-b-P(MA-POSS)$_{10}$ at a concentration of 1.0 mg/mL in THF shown in FIG. 5, indicate that the stereocomplex exists in the form of compact aggregates with diameters in the range of 100-150 nm.

Example 6

Figure 7A:
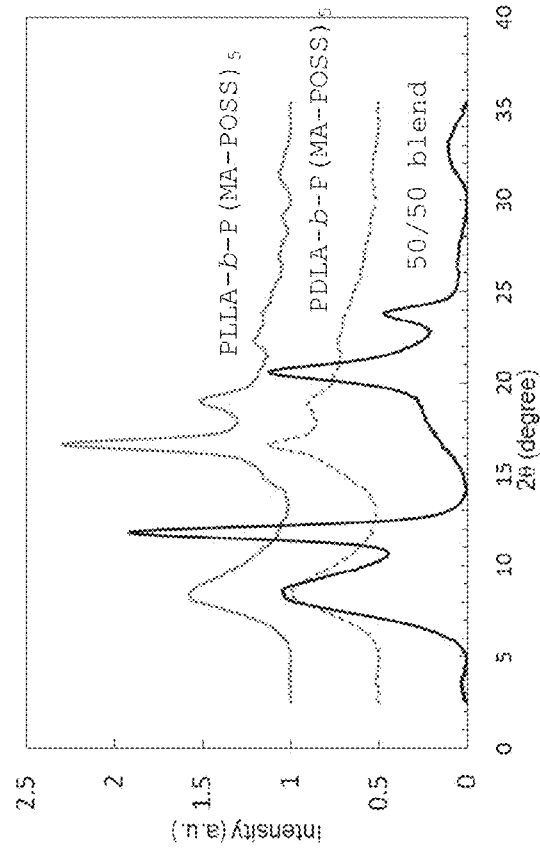
FIG. 7A shows the WAXS diffractogram of PLLA-b-P(MA-POSS)$_5$, PDLA-b-P(MA-POSS)$_5$, and their 1:1 blend.
Figure 7B:
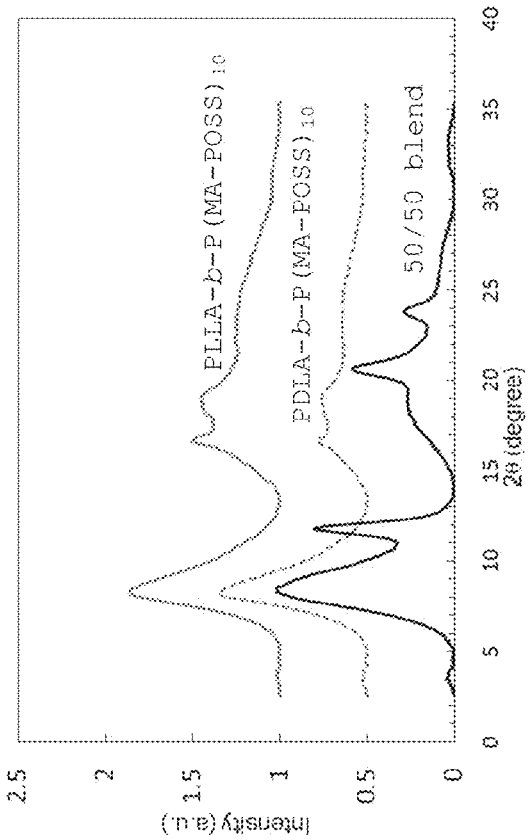
FIG. 7B shows the WAX diffractograms of PLLA-b-P(MA-POSS)$_{10}$, PDLA-b-P(MA-POSS)$_{10}$ and their 1:1 blend.

Differential Scanning Calorimetry (DSC) and Wide-Angle X-Ray Scattering (WAXS) Studies DSC and WAXS studies of the block copolymers were carried out. The DSC thermograms (FIG. 6) and wide-angle x-ray scattering (WAXS) diffractograms (FIG. 7) confirm that stereocomplexation occurs in the 50/50 solution blends between PLLA-b-P(MA-POSS) and PDLA-b-P(MA-POSS) hybrid block copolymers. However, the content of stereocomplex crystalline (SC) phase varies depending on the number of MA-POSS repeating units in the hybrid block copolymer. The thermograms in FIG. 6A and FIG. 6B indicate that the blends of PLA-b-P(MA-POSS) and PDLA-b-P(MA-POSS$_5$) exhibit very sharp stereocomplex melting peaks at around 221-225° C. during a first and second heating scans with a ramp rate of 10° C./min, respectively. However, with the increase in MA-POSS repeating units in PLLA-b-P(MA-POSS$_{10}$)+PDLA-b-P(MA-POSS$_{10}$) blends, the melting peaks of the stereocomplex phase become broader, less intense and shifted to a lower temperature (213-217° C.), as shown in FIG. 6C and FIG. 6D. This indicates that the presence of more MA-POSS units in the hybrid block copolymer would inhibit the formation of stereocomplex crystals. Moreover, the shoulder peaks that appear between 110-170° C. are caused by the existence of homopolymer crystal line phases (HC) formed from residual PLLA or PDLA in the solution, and occurs when the process stereocomplexation is incomplete. Table 1 shows that as the MA-POSS repeating unit number decreases from 10 to 5, the heat of fusion of the SC increases indicating enhanced stereocomplexation. This is further confirmed in FIG. 7A where higher WAXS diffractogram peak intensities at 2θ=12° and 21° (dedicated to the SC phase) were found in the PLA-b-P(MA-POSS$_5$)+PDLA-b-P(MA-POSS$_5$) blends.

TABLE 1

| | 1$^{st}$ heating scan | | | | 2$^{nd}$ heating scan | | | |
|---|---|---|---|---|---|---|---|---|
| | HC phase | | SC phase | | HC phase | | SC phase | |
| Sample | $T_m$ (° C.) | ΔH (J/g) | $T_m$ (° C.) | ΔH (J/g) | $T_m$ (° C.) | ΔH (J/g) | $T_m$ (° C.) | ΔH (J/g) |
| PLLA-b-P(MA-POSS)$_5$ | 157.8 | 30.1 | — | — | 155.9 | 29.5 | — | — |
| PDLA-b-P(MA-POSS)$_5$ | 160.2 | 30.7 | — | — | 158.5 | 30.2 | — | — |
| 50/50 blend | — | — | 225.4 | 61.3 | — | — | 221.6 | 57.4 |
| PLLA-b-P(MA-POSS)$_{10}$ | 150.2 | 4.5 | — | — | — | — | — | — |
| PDLA-b-P(MA-POSS)$_{10}$ | 157.9 | 3.9 | — | — | — | — | — | — |
| 50/50 blend | 173.1 | 4.4 | 217.0 | 37.8 | — | — | 213.0 | 32.6 |

COMPARATIVE EXAMPLES

Example 7

Comparison of the Mechanical Properties of PLA Pellets Melt Blended with MA-POSS or PDLA-b-P(MA-POSS) with Neat PLA Pellets The incorporation of both POSS and enantiopure PDLA PLLA units within a single hybrid block copolymer provides opportunity for the synergistic exploitation of nanofillers and stereocomplexation in maximizing the mechanical properties of PLA. In this comparative example, melt blending was first employed to directly incorporate the hybrid block copolymer into commercially available PLA as it is considered a process which is more commercially compared to solution blending. Melt blending was performed by feeding commercial PLA pellets (Grade 3051D PLA, Natureworks Co. Ltd., USA) which compromises mainly L-lactide units, and the POSS fillers into an internal mixer or twin screw extruder set at a temperature of 140-180° C. The screw speed of the mixer was set at 100 rpm and the residence time of the material inside the barrel was about 9 minutes. After compounding, the materials were ground into flakes and later injection molded into specimens at barrel and mold temperatures of 190° C. and 45° C., respectively.

Figure 8B:
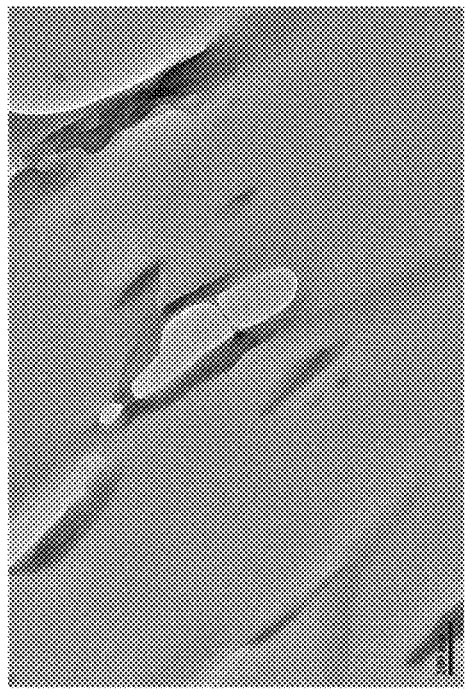
FIG. 8A, FIG. 8B and FIG. 8C are, respectively, the TEM micrographs of POSS-MA aggregates dispersed in a PLA matrix before tensile testing; after tensile testing where thereafter microvoid initiation within the POSS-MA aggregates are observed; and after further tensile testing where thereafter microvoids are observed to form an extensive network of macroscopic crack.
Figure 8C:
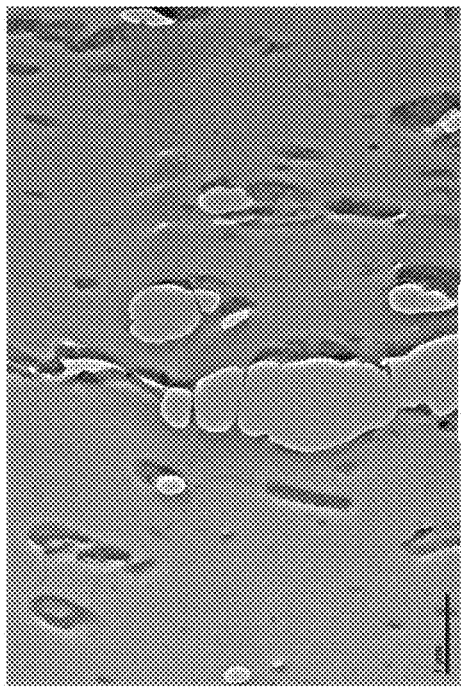
Figure 8A:
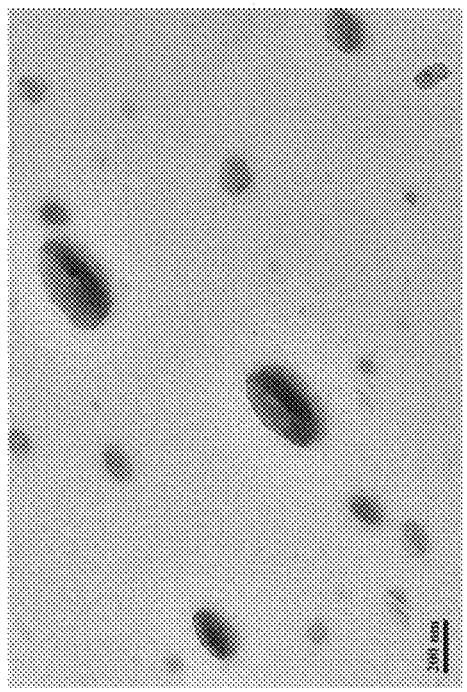

The ductility and toughness of the PLA matrix is seen to be improved significantly with the incorporation of MA-POSS to form nanocomposites. Table 2 shows the mechanical properties of neat PLA matrix as compared to PLA incorporated with various amounts of MA-POSS prepared through melt blending. A slight improvement in strain at break was observed during tensile testing when the content of MA-POSS in the blends was relatively low, e.g., ≤1-wt %. However, the blends exhibited significant enhancement in ductility when the content of MA-POSS was increased to 5 wt %. The MA-POSS aggregates were able to enhance the ductility of PLA through the promotion of microvoid formation. Upon tensile testing of the material, microvoids would initiate within the MA-POSS aggregates, as shown in FIGS. 8A to 8C, as the interparticle attraction is weaker compared to the POSS-matrix interfacial bonding. These microvoids would form almost simultaneously throughout a large area of the bulk and their sizes would become larger with an increasing loading.

TABLE 2

| Sample designation | Content (wt %) | | | Young's modulus (GPa) | Maximum tensile stress | Tensile strain break (%) |
|---|---|---|---|---|---|---|
| | POSS-MA | PLLA-b-POSS | PDLA-b-POSS | | | |
| 100 (PLA) | — | — | — | 3.41 | 67.44 | 3.68 |
| PLA + 0.05 (POSS) | 0.05 | — | — | 3.30 | 65.66 | 4.57 |
| PLA + 0.10 (POSS) | 0.10 | — | — | 3.56 | 64.92 | 4.89 |
| PLA + 0.50 (POSS) | 0.50 | — | — | 3.25 | 64.57 | 4.34 |
| PLA + 1.00 (POSS) | 1.00 | — | — | 3.28 | 65.69 | 3.67 |
| PLA + 3.00 (POSS) | 3.00 | — | — | 3.15 | 56.43 | 18.81 |
| PLA + 5.00 (POSS) | 5.00 | — | — | 3.29 | 60.02 | 8.01 |
| PLA + 7.00 (POSS) | 7.00 | — | — | 2.98 | 51.02 | 9.14 |
| PLA + 1.00 (PLLA-b-POSS$_{10}$) | — | 1.00 | — | 3.12 | 66.77 | 4.11 |
| PLA + 1.00 (PDLA-b-POSS$_{10}$) | — | — | 1.00 | 3.16 | 66.17 | 11.12 |

The expansion of the microvoids would eventually lead to their connection with other microvoids to form a large network of macroscopic cracks prior to eventual fracture. The process of microvoid formation throughout a large area will lead to high energy absorbance, while the rate of crack propagation will depend on the size and distribution of the MA-POSS particles. A critical size of the MA-POSS aggregates has to be reached in order for microvoids to initiate within the aggregates. In the case of 5 wt % MA-POSS compositions, the sizes of the MA-POSS aggregates were larger than the critical size and therefore microvoids could form easily within the aggregates. However, due to the inhomogeneous distribution of the aggregate sizes, there would be a preference for microvoids to form in larger aggregates. This contributes to the reduction in maximum tensile stress of the bulk material, as seen from Table 2.

The mechanical properties of the PLA can improve significantly with the presence of PDLA-b-P(MA-POSS) copolymer as a filler as the incorporation of the filler into the PLA matrix results in an interaction between the PDLA segments in the filler and the PLLA molecules from the matrix, forming stereocomplex crystals. This will significantly enhance the interfacial adhesion between the POSS hybrid and the PLA matrix. The number of repeating units of MA-POSS and the molecular weight ($M_w$) of the PDLA segment in the filler can effect the extent of stereocomplexation and filler-matrix interfacial bonding strength. Stereocomplex crystals are widely known to be more thermally stable and exhibit better mechanical properties as compared to homopolymer PLLA or PDLA crystals. However, in this case, the stereocomplex crystals are exploited not for their mechanical performance but as a carrier to control the size of POSS aggregates as well as to enhance interfacial adhesion between these particles with the matrix. As evident from Table 2, the strain at the breaking point of PLA incorporated with PDLA-b-P(MA-POSS) increased more than 250% as compared to neat PLA. In contrast nanocomposites prepared with an equivalent amount of PLLA-b-P(MA-POSS)$_{10}$ exhibit no significant improvement in mechanical properties.

Figure 9B:
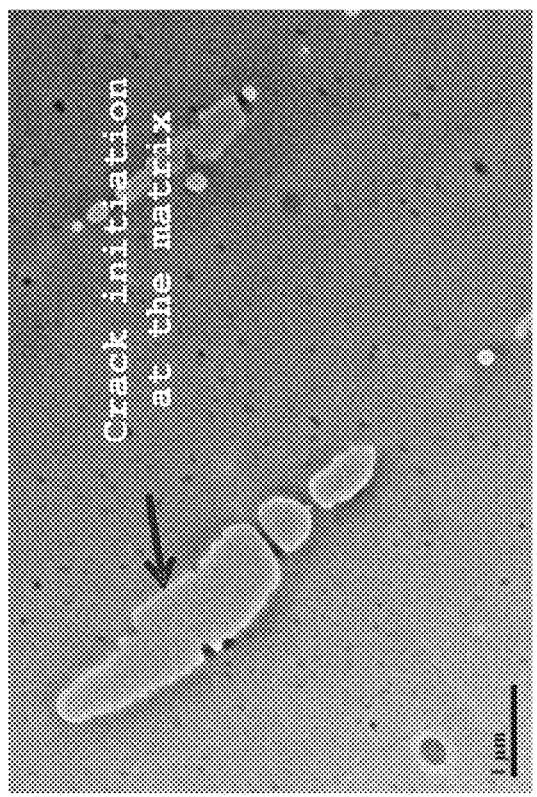
FIG. 9A and FIG. 9B respectively show the TEM micrographs (with a 5× magnification in the inset of FIG. 9A) of tensile tested PLA+PDLA-b-P(MA-POSS) 1 wt % depicting crack initiation within the MA-POSS aggregate, and tensile tested PLA+PLLA-b-P(MA-POSS) 1 wt % depicting crack initiation at the matrix and aggregate-matrix interfacial regions.
Figure 9A:
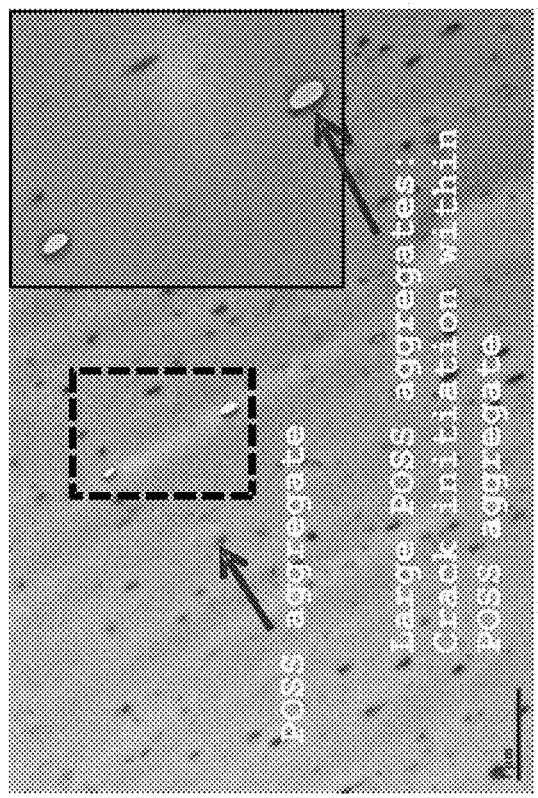

Stereocomplexation has also been shown to increase the size of MA-POSS aggregates in the melt blends. FIGS. 9A and 9B respectively show a comparison of TEM images taken of PLA+PDLA-b-POSS, and PLA+PLLA-b-POSS melt blends after tensile loading. The average size of the MA-POSS aggregates in the PLA+PDLA-b-P(MA-POSS) blends was significantly larger than that in the PLA+PLLA-b-P(MA-POSS) blends, which will consequently affect the crack formation and propagation mechanism in these blends. As explained earlier, aggregates larger than a critical size (such as those featured in FIG. 8) tend to act as stress concentration regions in which microvoids will form within the aggregates due to, e.g., the weaker interparticle attraction forces as compared to the aggregate-matrix interfacial strength. The formation of microvoids in smaller MA-POSS aggregates can be promoted by further enhancing the aggregate-matrix interfacial strength through stereocomplexation. FIG. 9A shows evidence of microvoid formation in PLA+PDLA-b-P(MA-POSS$_{10}$) blend even at 1 wt % filler concentration. In contrast, microvoids form preferentially within the matrix or at the aggregate-matrix interface in PLA-PLLA-b-P(MA-POSS$_{10}$) blend at similar filler concentration, as shown in FIG. 9B. It was also found that the aggregate size in the PLA+PDLA-b-P(MA-POSS$_{10}$) was larger. This could be due to the formation of stereocomplex network around the aggregates, which inhibits further separation and dispersion of the MA-POSS particles.

Example 8

Figure 10:
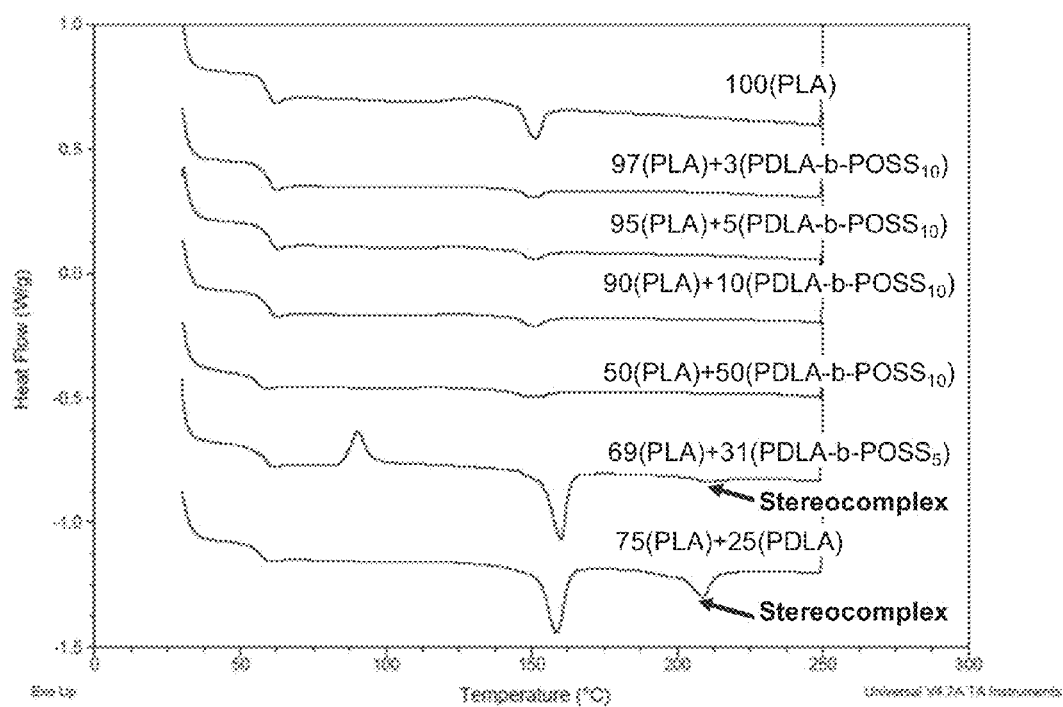
FIG. 10 is a comparison of the DSC thermograms between a PLA matrix and various compositions of POSS-PLA nanocomposites.

Comparison of the Thermal Properties of PLA Pellets Melt Blended with MA-POSS or PDLA-b-P(MA-POSS) with Neat PLA Pellets In this example, the thermal properties of PLA pellets melt blended with MA-POSS or PDLA-b-P(MA-POSS) was compared with those of neat PLA pellets. The extent of stereocomplex formation as well as the crystallization rate of the blended matrix depends on the number of repeating MA-POSS units as well as the molecular weight of the PDLA segment in the filler. A higher number of MA-POSS repeating units in the copolymer can hinder stereocomplex crystal formation as well as reduce the crystallization rate of the PLA matrix. FIG. 10 shows the differential scanning calorimetry (DSC) thermograms of different compositions of PLA incorporated with various amounts of PDLA-b-P(MA-POSS)$_{10}$. The compositions of the composites as well as their corresponding thermal properties are compiled in Table 3. The thermograms of the neat PLA resin (100 (PLA)) as well as a melt-blend of PLA and PDLA at a blend ratio of 75:25 is also presented for comparison. The 75 (PLA)+25 (PDLA) blend thermogram exhibits enthalpy peaks at 151° C. and 210° C., which are the respective melting points of the PLA homopolymer (hc) and the stereocomplex crystalline (SC) phases. However, the peak disappears when PDLA-b-P(MA-POSS) was incorporated into PLA, irrespective of the blend composition. Moreover, the HC peaks exhibited by these blends also becomes less intense as compared to that of neat PLA. This is an indication that the presence of 10 repeating units of MA-POSS in the co-polymer may hinder stereocomplexation while reducing the crystallization rate of the PLA matrix. Reducing the number of MA-POSS repeating units to half results in a slight resumption of stereocomplexation as well as an increase in HC content, as noted in the thermogram of 75 (PLA)+25 (PDLA-b-POSS$_5$) in FIG. 10.

TABLE 3

| Sample designation | Content (wt %) | | | HC Phase | | SC Phase | |
|---|---|---|---|---|---|---|---|
| | Equivalent PDLA | PDLA-b-P (MA-POSS$_5$) | PDLA-b-P (MA-POSS$_{10}$) | $T_m$ (° C.) | $\Delta H$ (J/g) | $T_m$ (° C.) | $\Delta H$ (J/g) |
| 100 (PLA) | — | — | — | 151.3 | 6.4 | — | — |
| 97 PLA + 3 (PDLA-b-POSS$_{10}$) | 1.5 | — | 3.0 | 151.3 | 2.2 | — | — |
| 95 PLA + 5 (PDLA-b-POSS$_{10}$) | 2.5 | — | 5.0 | 150.3 | 2.3 | — | — |
| 90 PLA + 10 (PDLA-b-POSS$_{10}$) | 5.0 | — | 10.0 | 150.3 | 2.0 | — | — |
| 50 PLA + 50 (PDLA-b-POSS$_{10}$) | 25.0 | — | 50.0 | 150.4 | 2.0 | — | — |
| 69 PLA + 31 (PDLA-b-POSS$_{10}$) | 25.0 | 25.0 | — | 153.4 | 11.9 | 210.1 | 1.5 |
| 75 PLA + 25 (PDLA) | 25.0 | — | — | 158.3 | 13.2 | 208.7 | 7.0 |

APPLICATIONS

Toughened PLA can be used as a packaging material due to its good transparency and biodegradability. The use of biodegradable pack aging materials can significantly reduce the amount of landfill space needed to contain waste materials.

Since PLA is synthesized from natural and sustainable precursors, toughened PLA is suitable green material for use in structural and non-structural components of, e.g., automotive, communication and sports applications In addition, MA-POSS is non-toxic and suitable to be incorporated into PLA to produce composites for biomedical as well as food packaging purposes.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A polymer comprising a polyester block and a polyacrylate block, wherein the polyester is capable of forming a stereocomplex with a compound comprising a complimentary polyester and the polyacrylate block comprises at least one polyhedral oligomeric silsesquioxane moiety.

2. The polymer of claim 1, wherein the polyester block comprises a polymer of Formula 1:

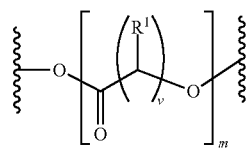

Formula 1 wherein m is a whole number selected from 2 to 350; v is a whole number selected from 1 to 10; and R$^1$ is independently selected from the group consisting of hydrogen, alkyl, alkenyl, alkynyl, aralkyl, cycloalkyl, cycloalkenyl, heterocycloalkyl, and heterocycloalkenyl.

3. The polymer of claim 2, the polyester block comprises a substantially enantiomerically pure aliphatic polyester.

4. The polymer of claim 2, wherein the polyester block comprises one of substantially pure poly(D-lactic acid) or poly(L-lactic acid).

5. The polymer of claim 1, wherein the polyacrylate block comprises about 1-20 polyhedral oligomeric silsesquioxanes moieties.

6. The polymer of claim 1, wherein the polyacrylate block is represented by Formula 2:

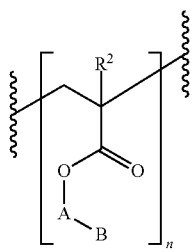

Formula 2 wherein
n is a whole number selected between 1 and 20;
A has the formula —(CR$_2$)$_p$— or —[CR$_2$CR$_2$(OCR$_2$CR$_2$)$_q$]—, wherein, p is whole number selected from 1-20; q is a whole number selected from 1-10; R is independently selected from the group consisting of hydrogen, alkyl, alkenyl, alkynyl, aralkyl, cycloalkyl, cycloalkenyl, heterocycloalkyl, and heterocycloalkenyl;

B is the polyhedral oligomeric silsesquioxane moiety; and $R^2$ is independently selected from the group consisting of hydrogen, alkyl, alkenyl, alkynyl, aralkyl, cycloalkyl, cycloalkenyl, heterocycloalkyl, and heterocycloalkenyl.

7. The polymer of claim 1, wherein the polymer is represented by Formula 3:

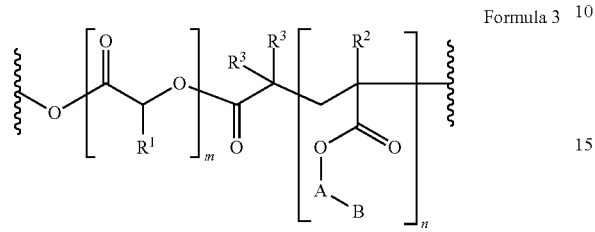

Formula 3 wherein m is a whole number selected from 2 to 350;

n is a whole number selected between 1 and 20;

A has the formula $-(CR_2)_p-$ or $-[(CR_2)_q(OCR_2CR_2)_t]-$, wherein, p is whole number selected from 1-20; q is a whole selected from 1-10; t is a whole selected from 1-10;

B is the polyhedral oligomeric silsesquioxane moiety;

R is independently selected from the group consisting of hydrogen, alkyl, alkenyl, alkynyl, aralkyl, cycloalkyl, cycloalkenyl, heterocycloalkyl, and heterocycloalkenyl;

$R^1$ is independently selected from the group consisting of hydrogen, alkyl, alkenyl, alkynyl, aralkyl, cycloalkyl, cycloalkenyl, heterocycloalkyl, and heterocycloalkenyl;

$R^3$ is independently selected from the group consisting of hydrogen, alkyl, alkenyl, alkynyl, aralkyl, cycloalkyl, cycloalkenyl, heterocycloalkyl, and heterocycloalkenyl; and $R^4$ is independently selected from the group consisting of hydrogen, alkyl, aralkyl, cycloalkyl, and aryl.

8. The polymer of claim 1 or 7, wherein the polyhedral oligomeric silsesquioxane moiety is selected from the group consisting of:

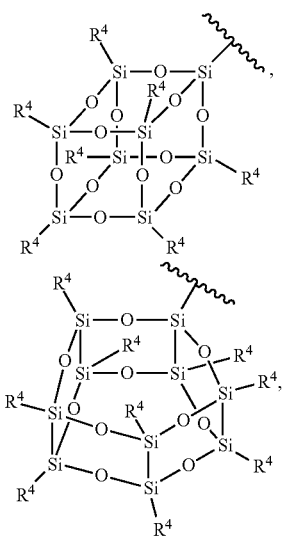

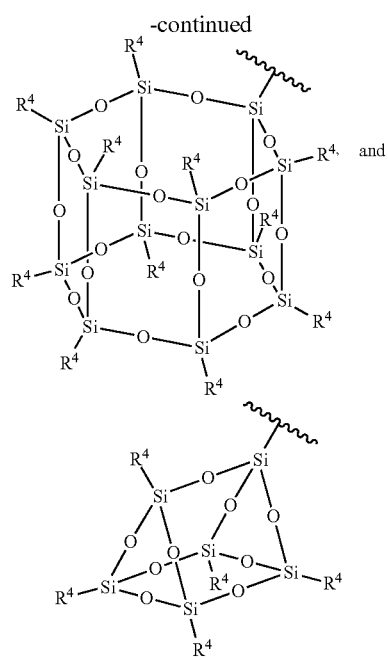

wherein $R^4$ is hydrogen, alkyl, alkenyl, alkynyl, aralkyl, cycloalkyl, cycloalkenyl, heterocycloalkyl, and heterocycloalkenyl.

9. The polymer of claim 7, wherein the polyester block is terminated with a moiety selected from the group consisting of hydrogen, alkyl, alkenyl, alkynyl, aralkyl, cycloalkyl, cycloalkenyl, heterocycloalkyl, and heterocycloalkenyl; or has the formula $CR_3(OCR_2CR_2)_u-$; wherein u is a whole number selected from 1-20; and R is independently selected from the group consisting of hydrogen, alkyl, alkenyl, alkynyl, aralkyl, cycloalkyl, cycloalkenyl, heterocycloalkyl, and heterocycloalkenyl.

10. The polymer of claim 1, wherein the polymer is represented by Formula 4:

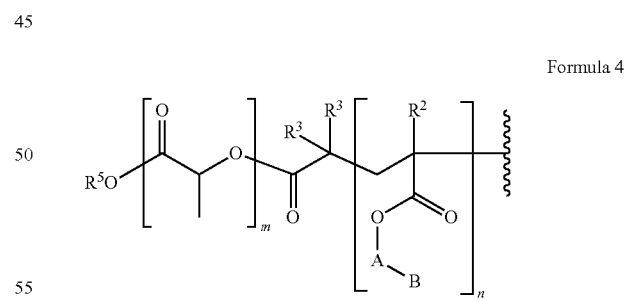

Formula 4 wherein m is a whole number selected from 2 to 350;

n is a whole number selected between 1 and 15;

A has the formula $-(CR_2)_p-$ or $-[(CR_2)_q(OCR_2CR_2)_t]-$, wherein, p is a whole number selected from 1-20; q is a whole selected from 1-10; t is a whole selected from 1-10;

B is the polyhedral oligomeric silsesquioxane moiety selected from the group consisting of:

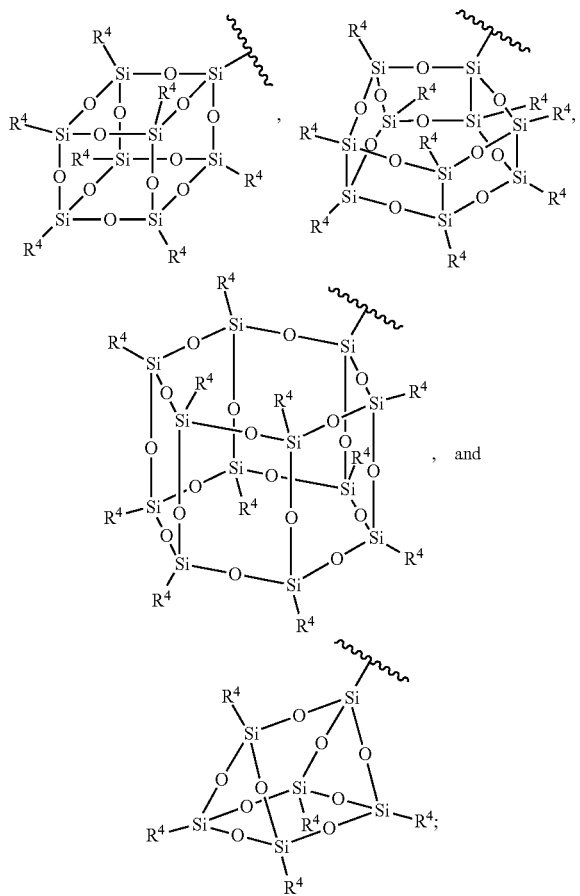

$R^2$ is independently selected from hydrogen and alkyl;

$R^3$ is independently selected from the group consisting of hydrogen, alkyl, aralkyl, cycloalkyl, and aryl;

$R^4$ is independently selected from the group consisting of hydrogen, alkyl, aralkyl, and cycloalkyl;

$R^5$ is selected from the group consisting of hydrogen, alkyl, aralkyl, cycloalkyl, heterocycloalkyl, and aryl; or has the formula —$[CR_3(OCR_2CR_2)_u]$— wherein u is a whole number selected from 1-20; and R is independently selected from the group consisting of hydrogen, alkyl, aralkyl, cycloalkyl, and heterocycloalkyl.

11. The polymer of claim 1, wherein the compound comprising a complimentary polyester comprises poly(D-lactic acid) or poly(L-lactic acid).

12. The polymer of claim 11, wherein the complimentary polyester is a polymer of claim 1, poly(D-lactic acid), or poly(L-lactic acid).

13. A stereocomplex comprising at least one polymer of claim 1.

14. A composite comprising a stereocomplex and at least one matrix polymer, wherein the stereocomplex comprises at least one polymer of claim 1.

15. The composite of claim 14, wherein the stereocomplex further comprises a second polymer of claim 1 or a polymer used for forming the matrix polymer which is a polyester.

16. The composite of claim 14, wherein the polymer of claim 1 comprises about 1% to about 10% by weight of the composite.

17. The composite of claim 15, wherein the polyester is poly(D-lactic acid) or poly(L-lactic acid).

18. The composite of claim 14, wherein the composite is prepared by melt compounding.

19. The composite of claim 14, wherein the polymer of claim 1 is present in crystalline form.

20. A method comprising the steps of contacting a polymer of claim 1 with a compound comprising a complimentary polyester under conditions that favor stereocomplexation, thereby forming a stereocomplex comprising the polymer of claim 1 and the compound comprising a complimentary polyester.

21. The method of claim 20, wherein the compound comprising a complimentary polyester comprises substantially pure poly(D-lactic acid) or poly(L-lactic acid).

22. The method of claim 21, wherein the complimentary polyester is a polymer of claim 1, poly(D-lactic acid), or poly(L-lactic acid).

23. The method of claim 20, further comprising the step of melt mixing the stereocomplex with at least one matrix polymer.

24. The method of claim 23, wherein the melt mixing takes place at a temperature less than about 200° C.

25. The method of claim 23, wherein the matrix polymer is poly(D-lactic acid) or poly(L-lactic acid).

* * * * *